US012784764B2

(12) United States Patent
Bloomfield et al.

(10) Patent No.: US 12,784,764 B2
(45) Date of Patent: Nov. 3, 2026

(54) SYSTEMS AND METHODS RELATING TO SYNCHRONIZATION AND ANALYSIS OF AUDIO COMMUNICATIONS DATA AND TEXT DATA

(71) Applicant: DIGITAL REASONING SYSTEMS, INC., Franklin, TN (US)

(72) Inventors: Tyrale Bloomfield, Franklin, TN (US); Josh Goodwin, Franklin, TN (US); Ben Tedder, Franklin, TN (US); Chason Choate, Franklin, TN (US)

(73) Assignee: DIGITAL REASONING SYSTEMS, INC., Franklin, TN (US)

( * ) Notice: Subject to any disclaimer, the term of this patent is extended or adjusted under 35 U.S.C. 154(b) by 105 days.

(21) Appl. No.: 18/688,062

(22) PCT Filed: Aug. 31, 2022

(86) PCT No.: PCT/US2022/042142
§ 371 (c)(1),
(2) Date: Feb. 29, 2024

(87) PCT Pub. No.: WO2023/034372
PCT Pub. Date: Mar. 9, 2023

(65) Prior Publication Data

US 2024/0404546 A1 Dec. 5, 2024

Related U.S. Application Data

(60) Provisional application No. 63/239,222, filed on Aug. 31, 2021.

(51) Int. Cl.
*G10L 15/18* (2013.01)
*G10L 15/04* (2013.01)
*G10L 21/12* (2013.01)

(52) U.S. Cl.
CPC .............. *G10L 21/12* (2013.01); *G10L 15/04* (2013.01); *G10L 15/18* (2013.01)

(58) Field of Classification Search
CPC ......... G10L 21/12; G10L 15/04; G10L 15/18; G10L 15/26; G10L 21/06; G10L 15/22;
(Continued)

(56) References Cited

U.S. PATENT DOCUMENTS 8,676,590 B1 * 3/2014 Sorensen ................ G06F 3/167
704/278
9,916,295 B1 * 3/2018 Crawford .............. G06F 40/166
(Continued)

OTHER PUBLICATIONS

International Search Report and Written Opinion in Application No. PCT/US2022/042142, mailed Jan. 3, 2023, 17 pages.
(Continued)

*Primary Examiner* — Jakieda R Jackson
(74) *Attorney, Agent, or Firm* — Bradley Arant Bault Cummings LLP; Adam J. Thompson, Esq.

(57) ABSTRACT

In some aspects, methods, systems, and computer-readable medium are disclosed which relate to synchronization and analysis of audio communications data and text data. Some embodiments can provide advantages and benefits in the area of communication surveillance. Some embodiments can provide for a streamlined, holistic communications review which can allow user(s) to unlock risks in voice communications data and/or text data. According to some aspects, and in some example embodiments, alignment of transcription and audio can provide for users to understand communications data more effectively.

28 Claims, 17 Drawing Sheets

(58) Field of Classification Search
CPC . G10L 13/00; H04M 7/0078; H04M 2201/40; H04M 3/2281; H04M 3/5175; G06N 20/00; G06F 40/30
See application file for complete search history.

(56) References Cited

U.S. PATENT DOCUMENTS

| | | | | |
|---|---|---|---|---|
| 11,263,229 | B1* | 3/2022 | Basavaiah | G06F 16/2477 |
| 11,762,869 | B1* | 9/2023 | Werner | G06T 11/206 707/722 |
| 2003/0009694 | A1* | 1/2003 | Wenocur | H04L 63/08 713/176 |
| 2006/0149558 | A1 | 7/2006 | Kahn et al. | |
| 2013/0080384 | A1* | 3/2013 | Briggs | G06F 16/433 707/610 |
| 2014/0039871 | A1* | 2/2014 | Crawford | G06F 40/40 704/2 |
| 2016/0227039 | A1* | 8/2016 | Demmitt | H04M 3/537 |
| 2017/0091320 | A1 | 3/2017 | Psota et al. | |
| 2017/0270627 | A1 | 9/2017 | Hodge | |
| 2018/0349335 | A1* | 12/2018 | Hodge | G10L 15/26 |
| 2019/0130894 | A1 | 5/2019 | Jin et al. | |
| 2019/0294718 | A1* | 9/2019 | Beringer | G06F 16/2477 |
| 2019/0327271 | A1* | 10/2019 | Saxena | G06N 3/0455 |
| 2020/0387676 | A1 | 12/2020 | Kim et al. | |
| 2021/0158813 | A1 | 5/2021 | Swaminathan et al. | |
| 2021/0342836 | A1* | 11/2021 | Cella | G06Q 30/0208 |
| 2021/0397610 | A1 | 12/2021 | Singh et al. | |

OTHER PUBLICATIONS

European Search Report received in European application No. 22865479.4-1207 mailed on Jun. 16, 2025.
Singapore Search Report received in Singapore application No. 11202406670Q mailed on July 1, 202.

* cited by examiner

Top Navigation - Activity

Top Navigation - Metadata

Top Navigation - Activity

SYSTEMS AND METHODS RELATING TO SYNCHRONIZATION AND ANALYSIS OF AUDIO COMMUNICATIONS DATA AND TEXT DATA

CROSS-REFERENCE TO RELATED APPLICATION

This application claims priority to, and the benefit of, U.S. Provisional Patent Application No. 63/239,222, filed Aug. 31, 2021, the entire contents of which is hereby incorporated by reference.

BACKGROUND

The present disclosure generally relates to monitoring communications for activity that violates ethical, legal, or other standards of behavior and poses risk or harm to institutions or individuals. The need for detecting violations in the behavior of representatives of an institution has become increasingly important in the context of proactive compliance, for instance. For example, in the modern world of financial services, there are many dangers to large institutions from a compliance perspective, and the penalties for non-compliance can be substantial, both from a monetary standpoint and in terms of reputation. Institutions are coming under increasing pressure to quickly identify unauthorized trading, market manipulation and unethical conduct within their organization, for example, but often lack the tools to do so effectively.

Among other needs, there exists a need for effective identification of activity that violates ethical, legal, or other standards of behavior and poses risk or harm to institutions or individuals from communications. It is with respect to these and other considerations that the various embodiments described below are presented.

SUMMARY

Embodiments of the present disclosure are directed generally towards methods, systems, and computer-readable storage medium relating to, in some embodiments, synchronization and analysis of audio communications data and text data.

Some aspects and embodiments disclosed herein may be utilized for providing advantages and benefits in the area of communication surveillance for regulatory compliance. Some implementations can process all communications, including electronic forms of communications such as instant messaging (or "chat"), email, voice, and/or social network messaging to connect and monitor an organization's employee communications for regulatory and corporate compliance purposes. Some embodiments of the present disclosure unify detection, user interfaces, behavioral models, and policies across all communication data sources, and can provide tools for compliance analysts in furtherance of these functions and objectives. Some implementations can proactively analyze users' actions to identify breaches such as unauthorized activities that are against applicable policies, laws, or are unethical, through the use of natural language processing (NLP) models.

Among other benefits and advantages, the present disclosure can provide a streamlined, holistic communications review which can allow user(s) to unlock risks in voice communications data, in accordance with some aspects and example embodiments of the present disclosure. According to some aspects, and in some example embodiments, alignment of transcription and audio can provide for users to understand communications data more effectively. Conversational patterns and interactions within communication data that may have been previously hidden can now be made more visible and actionable.

In one aspect, the present disclosure relates to a computer-implemented method. In one or more embodiments, the method includes the steps of receiving audio data; transcribing the audio data into text, based on one or more languages being spoken within the audio data; identifying a potential violation of a predetermined standard within at least the transcribed text, wherein the identified potential violation corresponds to a match of a potential violation of a predetermined policy, wherein the policy corresponds to at least one scenario and target population, and wherein the predetermined standard is based on the at least one scenario; generating an alert in response to the match of the potential violation of the predetermined policy; generating an audio waveform representing the audio data and outputting a visual representation corresponding to the audio waveform, wherein the visual representation of the audio waveform is displayed along a vertical axis; and generating a visual representation of the transcribed text, along a horizontal axis perpendicular to the vertical axis, such that lines of the transcribed text, as output for display, are synchronized with and align with corresponding portions of the audio waveform.

In one or more embodiments, the method further includes receiving text data from an electronic communication between persons, and wherein identifying the potential violation of the predetermined standard further comprises identifying the potential violation based on both the audio data and the received text data from the electronic communication In one or more embodiments, transcribing the audio data into text is based on multiple languages being spoken within the audio data.

In one or more embodiments, identifying the potential violation comprises implementing a machine learning model.

In one or more embodiments, the at least one scenario comprises a lexicon representing one or more terms or regular expressions.

In one or more embodiments, the at least one scenario comprises at least one of features corresponding to a machine learning model, features corresponding to a lexicon, and natural language features.

In one or more embodiments, the at least one scenario is formed by joining the machine learning features and the lexicon features, using Boolean operators.

In one or more embodiments, the method further comprises outputting, for display, a play head configured to move through the audio waveform and/or corresponding, aligned text during playback.

In one or more embodiments, the play head moves vertically along the audio waveform as the transcribed text moves forwards or backwards in playback.

In one or more embodiments, the movement of the play head is controllable by a user based on received user input.

In one or more embodiments, as the audio data corresponding to the audio waveform moves forwards or backwards in playback, the location in time within the audio waveform is visually emphasized within the visual representation of the audio waveform.

In one or more embodiments, as the transcribed text corresponding to the audio data moves forwards or backwards in playback, the location in time corresponding to a corresponding segment of the transcribed text is visually emphasized.

In one or more embodiments, the emphasized segment of the transcribed text is underlined and/or highlighted.

In one or more embodiments, as the audio waveform and transcribed text are scrolled during playback, as displayed, the audio waveform and transcribed text scrolls in synchronization with the playback.

In one or more embodiments, the audio waveform and transcribed text are displayed within a webpage and the audio waveform and transcribed text scroll content of the webpage in synchronization with the playback.

In one or more embodiments, the visual representation corresponding to the audio waveform and the visual representation of the transcribed text are output for display to a user in an interactive graphical user interface.

In another aspect, the present disclosure relates to a system. In one or more embodiments, the system includes A voice surveillance system configured to: receive audio data, and transcribe the audio data into text, based on one or more languages being spoken within the audio data; and an electronic communications surveillance system, configured to: identify a potential violation of a predetermined standard within at least the transcribed text, wherein the identified potential violation corresponds to a match of a potential violation of a predetermined policy, wherein the policy corresponds to at least one scenario and target population, and wherein the predetermined standard is based on the at least one scenario, generate an alert in response to the match of the potential violation of the predetermined policy, and wherein the voice surveillance system and/or the electronic communications system are configured to: generate an audio waveform representing the audio data and output a visual representation corresponding to the audio waveform, wherein the visual representation of the audio waveform is displayed along a vertical axis, and generate a visual representation of the transcribed text, along a horizontal axis perpendicular to the vertical axis, such that lines of the transcribed text, as output for display, are synchronized with and align with corresponding portions of the audio waveform.

In one or more embodiments, the electronic communications surveillance system is configured to: receive text data from an electronic communication between persons, and wherein identifying the potential violation of the predetermined standard further comprises identifying the potential violation based on both the audio data and the received text data from the electronic communication.

In one or more embodiments, transcribing the audio data into text is based on multiple languages being spoken within the audio data.

In one or more embodiments, identifying the potential violation comprises implementing a machine learning model.

In one or more embodiments, the at least one scenario comprises a lexicon representing one or more terms or regular expressions.

In one or more embodiments, the at least one scenario comprises at least one of features corresponding to a machine learning model, features corresponding to a lexicon, and natural language features.

In one or more embodiments, the at least one scenario is formed by joining the machine learning features and the lexicon features, using Boolean operators.

In one or more embodiments, the voice surveillance system and/or the electronic communications system are configured to: output, for display, a play head configured to move through the audio waveform and/or corresponding, aligned text during playback.

In one or more embodiments, the play head moves vertically along the audio waveform as the transcribed text moves forwards or backwards in playback.

In one or more embodiments, the movement of the play head is controllable by a user based on received user input through a graphical user interface.

In one or more embodiments, as the audio data corresponding to the audio waveform moves forwards or backwards in playback, the location in time within the audio waveform is visually emphasized within the visual representation of the audio waveform.

In one or more embodiments, as the transcribed text corresponding to the audio data moves forwards or backwards in playback, the location in time corresponding to a corresponding segment of the transcribed text is visually emphasized.

In one or more embodiments, the emphasized segment of the transcribed text is underlined and/or highlighted.

In one or more embodiments, as the audio waveform and transcribed text are scrolled during playback, as displayed, the audio waveform and transcribed text scrolls in synchronization with the playback.

In one or more embodiments, the audio waveform and transcribed text are displayed within a webpage and the audio waveform and transcribed text scroll content of the webpage in synchronization with the playback.

In one or more embodiments, the visual representation corresponding to the audio waveform and the visual representation of the transcribed text are output for display to a user in an interactive graphical user interface.

In yet another aspect, the present disclosure relates to a computer-readable medium. In one or more embodiments, the computer-readable medium is a non-transitory computer-readable medium storing instructions which, when executed by one or more processors of a computer system, cause a computing system to perform functions that include receiving audio data; transcribing the audio data into text, based on one or more languages being spoken within the audio data; identifying a potential violation of a predetermined standard within at least the transcribed text, wherein the identified potential violation corresponds to a match of a potential violation of a predetermined policy, wherein the policy corresponds to at least one scenario and target population, and wherein the predetermined standard is based on the at least one scenario; generating an alert in response to the match of the potential violation of the predetermined policy; generating an audio waveform representing the audio data and outputting a visual representation corresponding to the audio waveform, wherein the visual representation of the waveform is displayed along a vertical axis; and generating a visual representation of the transcribed text, along a horizontal axis perpendicular to the vertical axis, such that lines of the transcribed text, as output for display, are synchronized with and align with corresponding portions of the audio waveform.

In one or more embodiments, the executable instructions further comprise, when executed, receiving text data from an electronic communication between persons, and wherein identifying the potential violation of the predetermined standard further comprises identifying the potential violation based on both the audio data and the received text data from the electronic communication.

In one or more embodiments, transcribing the audio data into text is based on multiple languages being spoken within the audio data.

In one or more embodiments, identifying the potential violation comprises implementing a machine learning model.

In one or more embodiments, the at least one scenario comprises a lexicon representing one or more terms or regular expressions.

In one or more embodiments, the at least one scenario comprises at least one of features corresponding to a machine learning model, features corresponding to a lexicon, and natural language features.

In one or more embodiments, the at least one scenario is formed by joining the machine learning features and the lexicon features, using Boolean operators.

In one or more embodiments, the executable instructions further comprise, when executed, outputting, for display, a play head configured to move through the audio waveform and/or corresponding, aligned text during playback.

In one or more embodiments, the play head moves vertically along the audio waveform as the transcribed text moves forwards or backwards in playback.

In one or more embodiments, the movement of the play head is controllable by a user based on received user input.

In one or more embodiments, as the audio data corresponding to the audio waveform moves forwards or backwards in playback, the location in time within the audio waveform is visually emphasized within the visual representation of the audio waveform.

In one or more embodiments, as the transcribed text corresponding to the audio data moves forwards or backwards in playback, the location in time corresponding to a corresponding segment of the transcribed text is visually emphasized.

In one or more embodiments, the emphasized segment of the transcribed text is underlined and/or highlighted.

In one or more embodiments, as the audio waveform and transcribed text are scrolled during playback, as displayed, the audio waveform and transcribed text scrolls in synchronization with the playback.

In one or more embodiments, the audio waveform and transcribed text are displayed within a webpage and the audio waveform and transcribed text scroll content of the webpage in synchronization with the playback.

In one or more embodiments, the visual representation corresponding to the audio waveform and the visual representation of the transcribed text are output for display to a user in an interactive graphical user interface.

Other aspects and features according to the example embodiments of the present disclosure will become apparent to those of ordinary skill in the art, upon reviewing the following detailed description in conjunction with the accompanying figures.

BRIEF DESCRIPTION OF THE DRAWINGS

Reference will now be made to the accompanying drawings, which are not necessarily drawn to scale.

DETAILED DESCRIPTION

Figure 1:
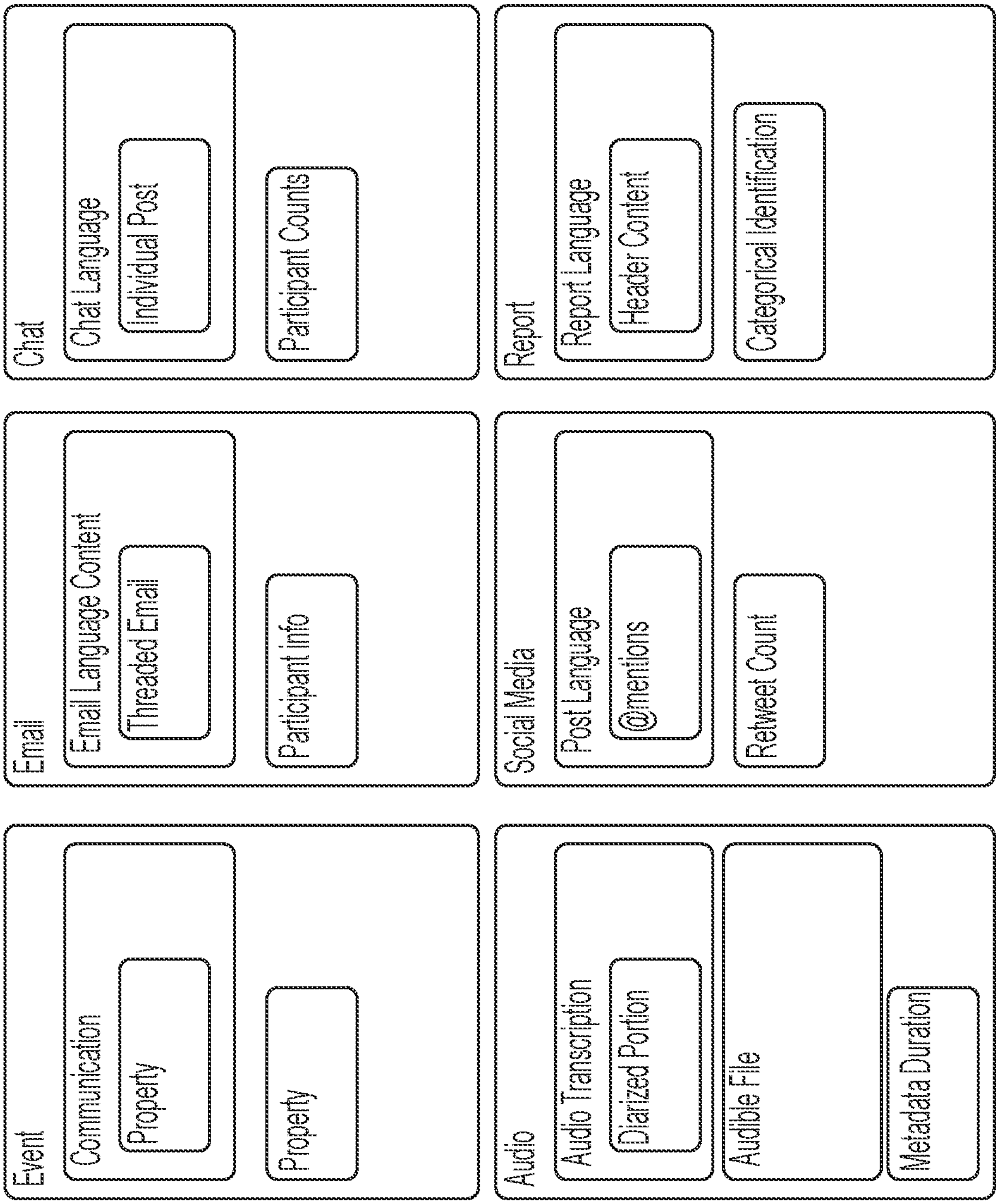
FIG. 1 illustrates aspects of displayed events, properties, and communications data, in accordance with one or more embodiments of the present disclosure.

Although example embodiments of the present disclosure are explained in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an" and "the" include plural referents unless the context clearly dictates otherwise.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

According to some embodiments of the present disclosure, audio can be plotted vertically and synced up to text from transcript(s) of an audio session. Line heights corresponding to lines of the text can be utilized. For example, the audio can be broken down into pieces of a certain duration, such as four-second pieces. The received input data can be a standard-format audio file. Other features of the present disclosure in some embodiments include functionalities for focus view (wherein there can be reduced visualization of certain text but not other text) and redacted transcriptions.

Definitions

The following discussion provides some descriptions and non-limiting definitions, and related contexts, for terminology and concepts used in relation to various aspects and embodiments of the present disclosure.

An "event" can be considered any object with a fixed time, and an event can be observable data that happens at a point in time, for example an email, a badge swipe, a trade (e.g., trade of a financial asset), or a phone call (see also the illustration of FIG. 1).

A "property" relates to an item within an event that can be uniquely identified, for example metadata (see also illustration of FIG. 1).

A "communication" can be any event with language content, for example email, chat, a document, social media, or a phone call (see also illustration of FIG. 1). A communication may also include, for example, audio, SMS, and/or video. A communication may additionally or alternatively be referred to herein as, or with respect to, a "comm" (or "comms"), message, container, report, or data payload.

A "metric" can be a weighted combination of factors to identify patterns and trends (e.g., a number-based value to represent behavior or intent from a communication). Examples of metrics include sentiment, flight risk, risk indicator, and responsiveness score. A metric may additionally or alternatively be referred to herein as, or with respect to, a score, measurement, or rank.

A "post" can be an identifier's contribution within a communication, for example a single email within a thread, a single chat post, a continuous burst of communication from an individual, or a single social media post (see also illustration of FIG. 1). A post can be considered as an individual's contribution to a communication.

A "conversation" can be a group of semantically related posts, for example the entirety of an email with replies, a thread, or alternative a started and stopped topic, a time-bound topic, and/or a post with the other post (replies). Several posts can make up a conversation within a communication.

A "signal" can be an observation tied to a specific event that is identifiable, for example rumor language, wall crossing, or language of interest.

A "lexicon" is a collection of terms (also referred to herein as "entries") that can be matched against text to find language of interest (e.g., language that may trigger an alert, described below). Terms can be strings of characters and/or operators that can implement a search pattern for matching text. A lexicon can include a grammar that defines syntax for the terms in the lexicon.

A "scenario" can be a combination of signals and metrics that can be applied to text. In some embodiments of the present disclosure, scenarios can be created by combining lexicons, machine learning models (e.g., pre-trained models described below), and natural language features. When a section of text matches the parameters set by the scenario, the scenario can trigger the generation of an alert (described below) which represents that a scenario match has occurred.

Figure 2A:
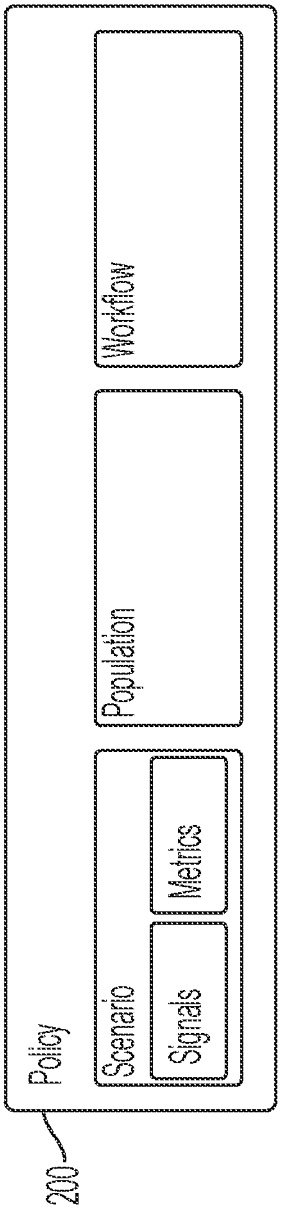
FIGS. 2A and 2B illustrate various aspects of policies, including scenario, population, and workflow, in accordance with one or more embodiments of the present disclosure.
Figure 2B:
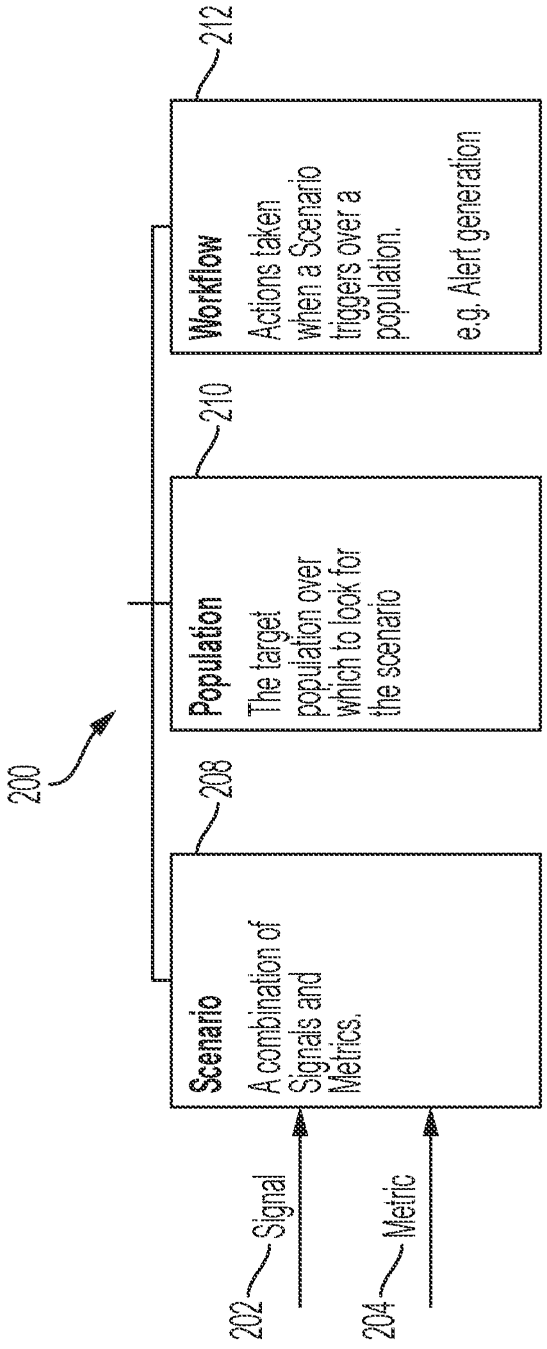

A "policy" can be a scenario applied to a population with a defined workflow. A policy may be, for instance, how a business chooses to handle specific situations, for example as it may relate to ongoing deal monitoring, disclaimer adherence, and/or anti money laundering (AML) monitoring. As illustrated in FIGS. 2A and 2B, in some embodiments a policy can be comprised of three items: a scenario as a combination of signals and metrics (as an example of usage, using NLP signals and metrics to discover intellectual property (IP) theft language or behaviors); a population, as the target population over which to look for the scenario (e.g., sales team(s), department(s), or group(s) of persons); and workflow, as actions taken when a scenario triggers over a population (e.g., alert generation).

An "alert" can indicate to a user that a policy match or scenario match has occurred which requires action (sometimes referred to herein with respect to "actioning" an alert). A signal that requires review can be considered an alert. As an example, an indication of intellectual property theft may be found in a chat post with language that matches the scenario, on a population that needs to be reviewed.

A "manual alert" can be an alert added to a communication from a user that was not generated from the system. A manual alert may be used, for example, when a user needs to add an alert to language or other factors for further review.

A "hit" can be an exact signal that applies to a policy on events, for example an occurrence of the language "I'm taking clients with me when I leave", a behavior pattern change, and/or a metric change.

A "review" can be the act of a user assigning actions on hits, alerts, or communications.

A "tag" can be a label attached to a communication for the purpose of identification or to give other information, for example a new feature set that will enable many workflow practices.

A "personal identifier" can be any structured field that can be used to define a reference or entity, for example "jeb@jebbush.com", "@CMcK", "EnronUser1234", or "(555) 336-2700" (i.e., a personal identifier can include email, a chat handle, or a phone number). As used herein, a hit may additionally or alternatively be referred to herein as, or with respect to, an "entity ID".

An "entity" can be an individual, object, and/or property IRL, and can have multiple identifiers or references, for example John Smith, IBM, or Enron. Other related terms may include profile, participant, actor, and/or resolved entity.

A "relationship" can be a connection between two or more identifiers or entities, for example "works in" department, person-to-person, person-to-department, and/or company-to-company.

The following discussion includes some descriptions and non-limiting definitions, and related contexts, for terminology and concepts that can relate to a graphical user interface (and associated example views as output to a user) that can be used by a user to interact with, visualize, and perform various functionalities in accordance to one or more embodiments of the present disclosure.

Figure 3:
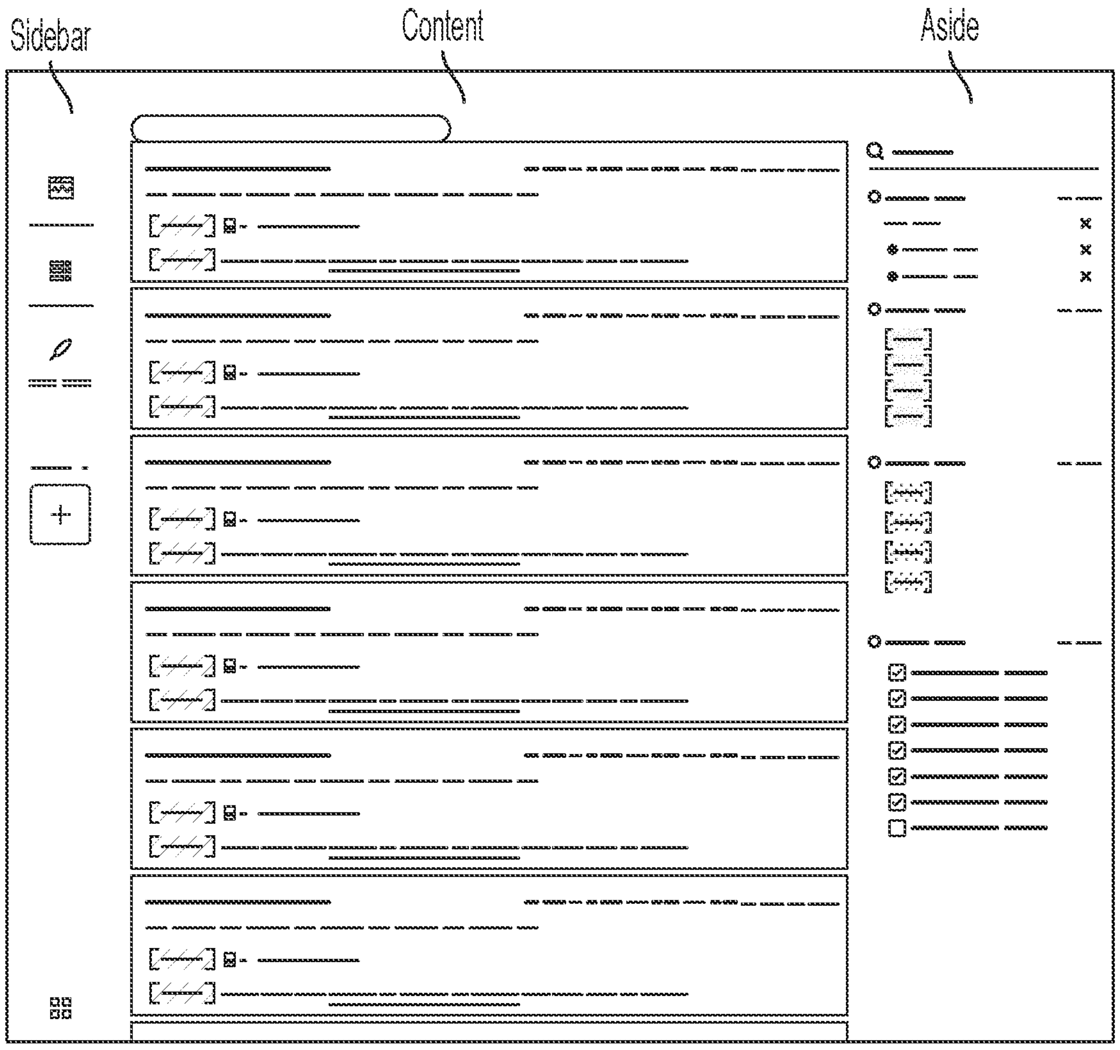
FIG. 3 illustrates various aspects displayed to a user, including elements of a graphical user interface, including sidebar, content, and aside areas, in accordance with one or more embodiments of the present disclosure.

A "sidebar" can be a global placeholder for navigation and branding (see, e.g., illustrations in FIG. 3).

"Content" as shown and labeled in, for example, FIG. 3, identifies where primary content will be displayed.

An "aside" as shown and labeled in, for example, FIG. 3, is a location for supportive components that affect the content or provide additional context. An aside can be a column of components that support, define, or manipulate the content area.

A "visual view" can include a chart, graph, or data representation that is beyond simple text, for example communications ("comms") over time, alters daily, queue progress, and/or relationship metric(s). As used herein, visual views may additionally or alternatively be referred to herein as, or with respect to charts or graphs.

The following discussion includes some descriptions and non-limiting definitions, and related contexts, for terminology and concepts that may particularly relate to machine learning models and the training of machine learning models, in accordance with one or more embodiments of the present disclosure.

A "pre-trained model" can be a model that performs a task but requires tuning (e.g., supervision and/or other interaction by an analyst or developer) before production. An "out of the box model" can be a model that benefits from, but does not require, tuning before use in production. Pre-trained models and out of the box models can be part of the building blocks for a policy.

In some embodiments, the present disclosure can provide for implementing analytics using "supervised" machine learning techniques (herein also referred to as "supervised learning"). Supervised mathematical models can encode a variety of different data aspects which can be used to reconstruct a model at run-time. The aspects utilized by these models may be determined by analysts and/or developers, for example, and may be fixed at model training time. Models can be retrained at any time, but retraining may be done more infrequently once models reach certain levels of accuracy.

Further Detailed Discussion

Embodiments of the present disclosure can include systems and methods for applying scenarios to combinations of text communications and audio communications to generate alerts for displaying the alerts, text communications, and audio communications to a user.

As described herein, a machine learning model can be a machine learning classifier that is configured to classify text. Additionally, in some embodiments, model training can include training models for analysis of text data from one or more electronic communications between at least two persons.

The present disclosure contemplates the machine learning training techniques known in the art can be applied to the data disclosed in the present disclosure for model training. For example, in some embodiments, the model training can include evaluating the model against established datasets. As another example, the model training can be based on a user input, for example a user input that labels the data.

When alert is received that a policy match occurs, an alert can be triggered/generated which indicates, to a user (e.g., a user of a graphical user interface), that a policy match has occurred which requires action. The policy can correspond to actions, for example, that violate at least one of a combination of signals and metrics, a population, and workflow (also referred to herein as a "violation" or "violation condition" in some uses). Additionally, the present disclosure contemplates that the alerts can be reviewed by the user or by a machine learning model. This review can include determining whether the alerts correspond to an actual violation.

Figure 18:
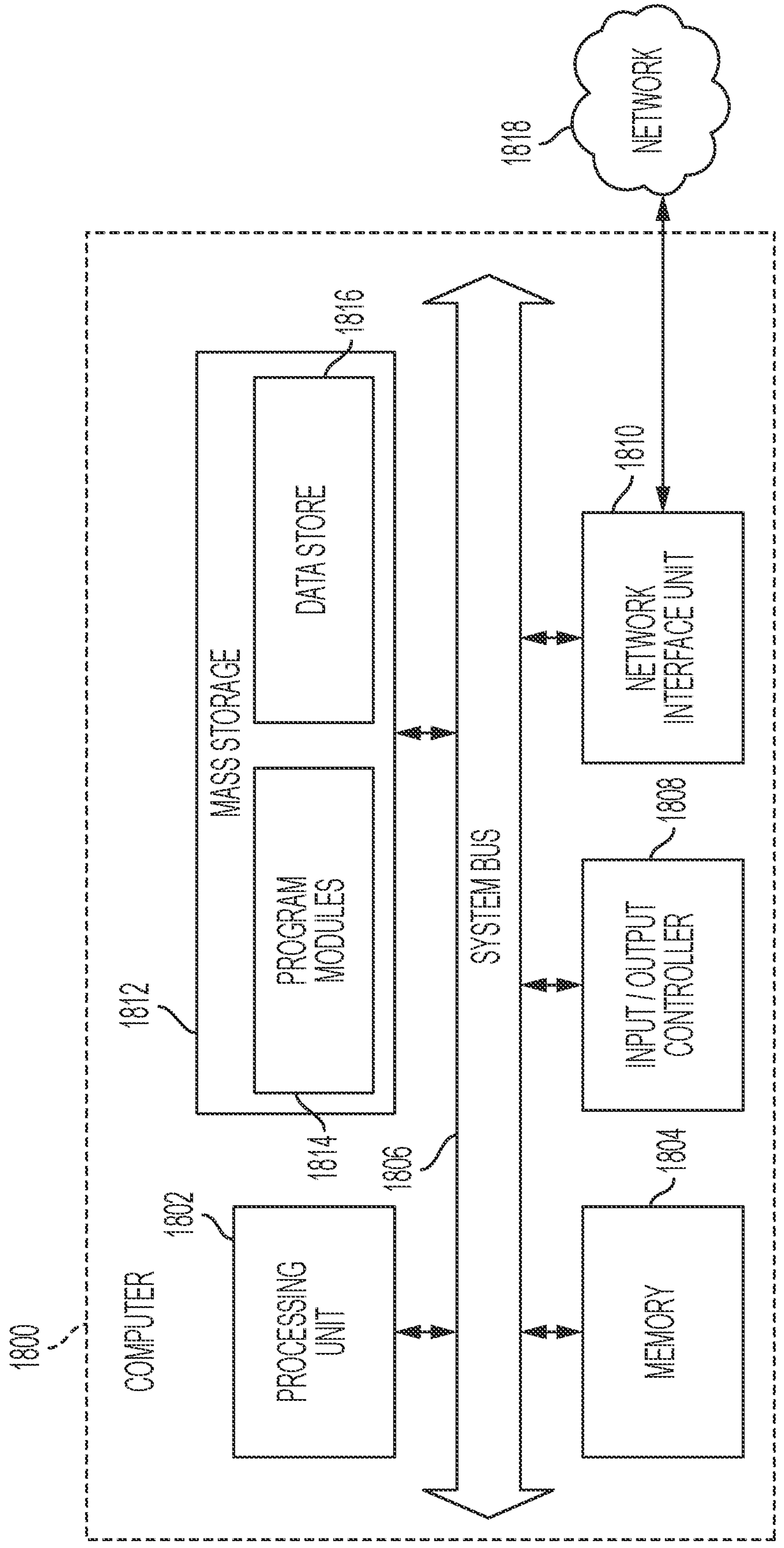
FIG. 18 is a computer architecture diagram showing a general computing system capable of implementing one or more embodiments of the present disclosure described herein.

In some embodiments of the present disclosure, a user can review the data and perform an interaction using a user interface (e.g., a graphical user interface that is part of or operably connected to the computer system illustrated in FIG. 18). The action can include review and interaction by a user via a user interface, which is optionally part of the computing device in FIG. 18. As a non-limiting example, in some embodiments, a system can provide the alert to the user through the user interface, and then the user can confirm or deny the accuracy of the alert using the user interface. Based on the user input, the system can determine whether the alert was a true positive, true negative, false positive, or false negative. The system can use the information about the alerts, including whether the alert was a true positive, true negative, false positive, or false negative, as an input into the system to improve the operation of the system. This can be referred to as "feedback." The present disclosure contemplates that the feedback can be an input into the machine learning model to improve the model training (e.g., the information about the alerts is "fed back" into the model to train the model further). Alternatively or additionally, the present disclosure contemplates that the feedback can be used to change other parameters within the scenario. For example, the feedback can be used to adjust the lexicon or non-language features of the scenario. This can include adding or removing terms from the lexicon, or adding/removing non-language features from the scenario.

Additionally, some embodiments of the present disclosure provide for increasing the accuracy of a conduct surveillance system. Systems and methods can be configured to receive at least one alert from a conduct surveillance system. As used in the present disclosure, a "conduct surveillance system" can refer to a tool for reviewing and investigating communications. Again, the alerts can represent a potential violation of a predetermined standard. The conduct surveillance system can generate the alerts in response to an electronic communication between persons matching a violation of a predetermined policy. The conduct surveillance system can include a voice surveillance system and/or an electronic communications surveillance system. As described in greater detail elsewhere in the present disclosure, the predetermined policy can include a scenario, a target population, and a workflow.

In some embodiments of the present disclosure, the scenario can include a machine learning classifier. Additionally, in some embodiments of the present disclosure, the scenario can include a lexicon. Again, as described herein, the lexicon can represent one or more terms or and regular expressions.

A non-limiting example of a term that can be included in the lexicon is a string of one or more text characters, (e.g., a word).

A system in accordance with some embodiments of the present disclosure can determine whether each of the at least one alert represents an actual violation of the predetermined policy. As a non-limiting example, if the predetermined policy can configured to detect the dissemination of confidential information. This could represent a violation of a law, regulation, or internal policy. But a communication identified by the predetermined policy as a potential violation may not represent an actual violation of the underlying law, regulation or policy (i.e., a false positive).

In some embodiments of the present disclosure, determining whether each alert represents an actual violation of the policy is referred to as "actioning" the alert. This can include determining whether each of the at least one alert represents an actual violation of the policy, law, or ethical standard that the policy/scenario that generated the alert is configured to detect. Actioning the alert can include displaying the alert to a user and receiving a user input from a user interface representing whether the alert represents an actual violation of the policy.

Figure 15:
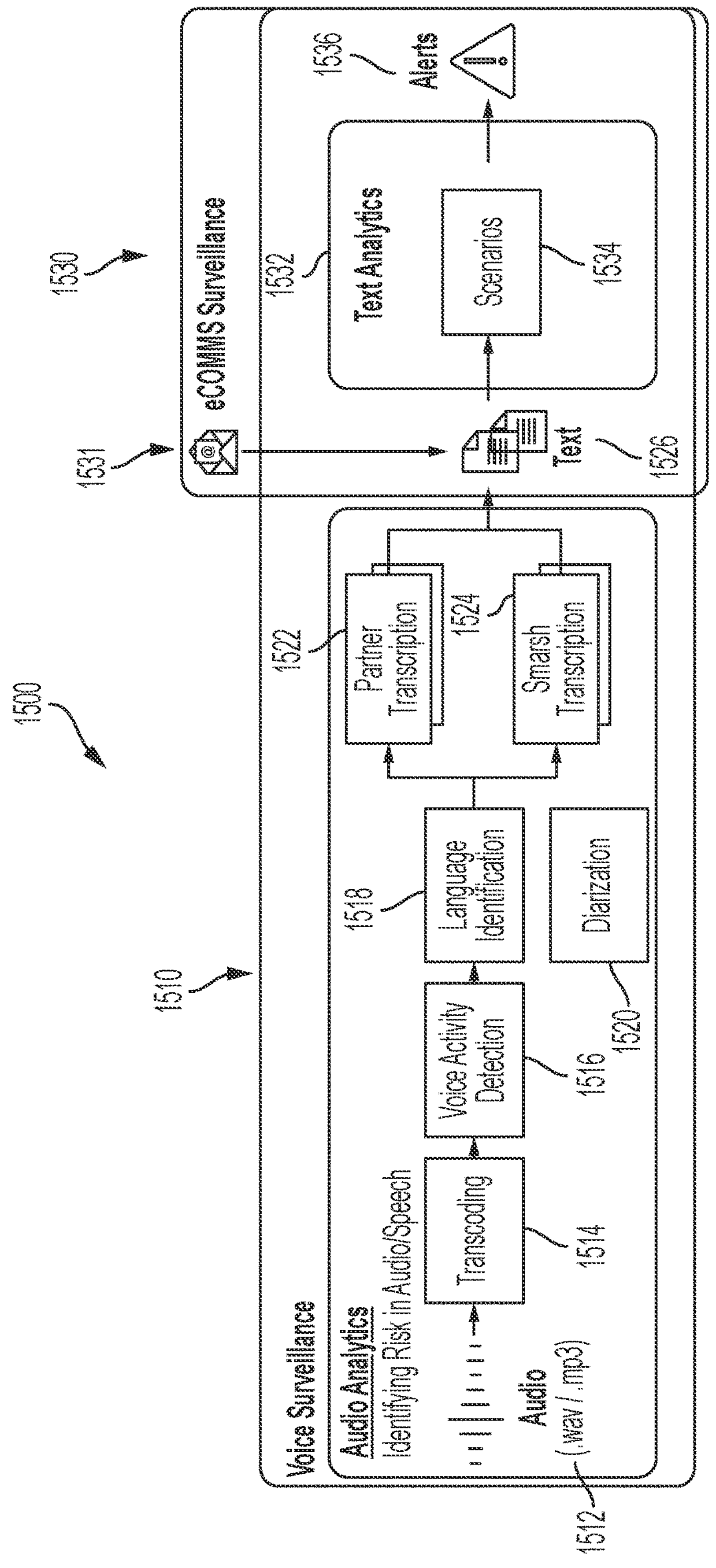
FIG. 15 illustrates a block diagram of a system for analyzing combined audio and text data, in accordance with one or more embodiments of the present disclosure.

FIG. 15 illustrates a block diagram of a system 1500 for analyzing combined audio and text data, in accordance with one or more embodiments of the present disclosure. Analyzing combined audio and text data can allow for alerts to be based on both text data (e.g., emails) and audio data (e.g., voice from a phone conversation). The system 1500 can include a voice surveillance system 1510 and a electronic communications surveillance system 1530.

Still with reference to FIG. 15, the voice surveillance system 1510 can be configured to receive an audio input 1512, which is optionally a stored audio file. Non-limiting examples of audio file formats are .wav and .mp3. The voice surveillance system 1510 can include a transcoding module 1514. The transcoding module 1514 can convert the audio input 1512 file format, if desired, and change the audio sampling rate.

The voice surveillance system 1510 can also include a voice activity detection module 1516. The voice activity detection module 1516 can determine when the audio input 1512 is silent (or the audio input is below a certain noise threshold) to indicate to the user that there is no usable input during that section of the audio input 1512.

In some embodiments of the present disclosure, the system can include a language identification module 1518. The language identification module 1518 can determine what language is being spoken during the audio input 1512, or if multiple languages are being spoken during different segments of the audio input.

In some embodiments of the present disclosure, the system can further include a diarization module 1520. As used herein, "diarization" refers to methods for determining the identity of a speaker in a section of audio input 1512. For example, the diarization module can assign each section of the audio input 1512 a speaker. Therefore, the voice surveillance system 1510 can identify who is speaking at each section of the audio input 1512.

Still with reference to FIG. 15, the system 1500 can include modules for transcribing the audio input 1512 into text. The language identification module 1518 can route the audio input 1512 to different transcription modules based on what language(s) is/are spoken in the audio input. Embodiments of the present disclosure can include a transcription module 1524 that can convert the audio input 1512 into text. In the example embodiment described herein, the transcription module may be referred to as "deepscribe." However, it should be understood that any system or method for performing transcription can be used by the transcription module, and that different systems and methods for performing transcription can have different capabilities. In some embodiments of the present disclosure, the transcription module 1524 may or may not be able to convert certain languages to text, or may be less accurate at transcribing certain languages. Therefore, the language identification module 1518 can use a partner transcription module 1522 to convert some or all of the audio input 1512 into text (e.g., the transcribed text 621 shown in FIG. 6). In some embodiments of the present disclosure, the partner transcription module can be another transcription system (e.g., a third-party translation software or computer system). Alternatively or additionally, in some embodiments the partner transcription module 1522 can be a system for routing the audio input 1512 to one or more human translators who can manually transcribe the audio input 1512 into text. Alternatively or additionally, the diarization module 1520 can tag each section of transcribed text with a speaker so that a user viewing the transcribed text 621 can see who is speaking.

As shown in FIG. 15, the output text 1526 from the partner transcription module 1522 and transcription module 1524 can be combined at the output of the voice surveillance system 1510.

Still with reference to FIG. 15, the electronic communications surveillance system 1530 can receive electronic communications from one or more users as a text input 1531.

The output text 1526 can be an input into a text analytics module 1532, which can include one or more scenarios 1534 configured to analyze the output text 1526. The scenarios 1534 can generate alerts based on the output text 1526 and the scenarios 1534 (e.g., the alert can be based on determining that a scenario match occurred), and the alerts 1536 can be displayed to the user using one or more user interfaces (e.g., the user interface 600 illustrated in FIG. 6). Alternatively or additionally, the user interface can include information from the inputs or outputs of any of the modules 1514, 1516, 1518, 1520, 1522, 1524. Alternatively or additionally, in some embodiments, the user interface can include part or all of the input audio 1512 and text input 1531. And, in some embodiments, the user interface can include information about the text analytics module 1532, and the scenarios 1534 and alerts 1536.

Figure 16:
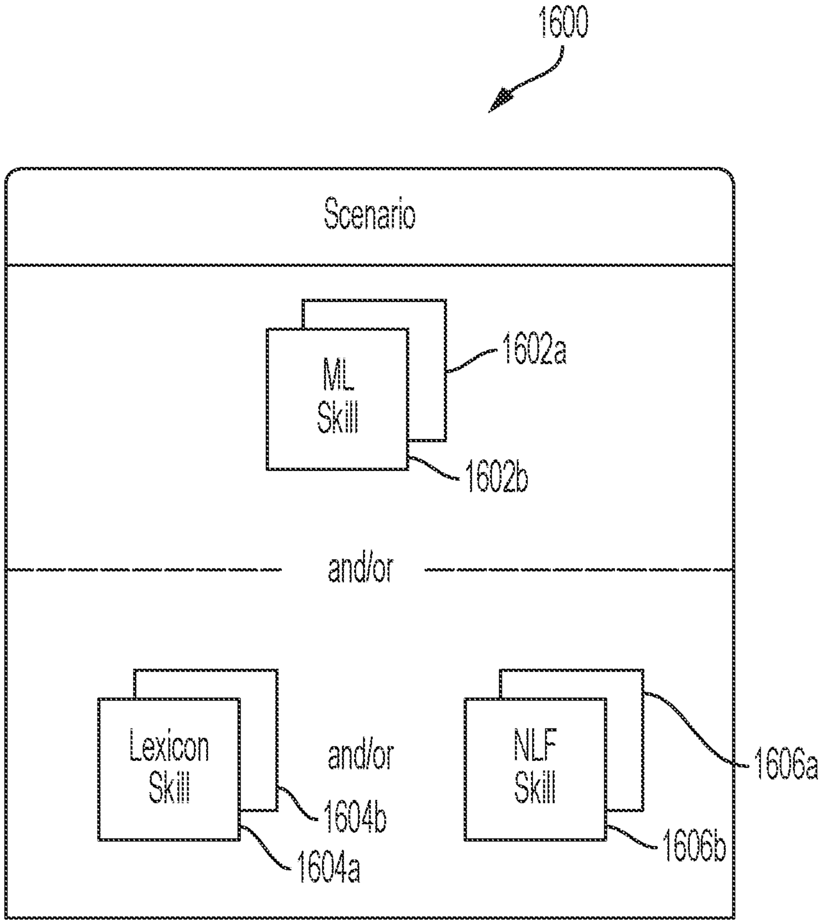
FIG. 16 illustrates a block diagram of a scenario, in accordance with one or more embodiments of the present disclosure.

With reference to FIG. 16, a block diagram of a scenario 1600 is shown. The scenario can include one or more machine learning blocks 1602*a*, 1602*b*. The machine learning blocks 1602*a*, 1602*b* can correspond to machine learning features. The scenario 1600 can further include one or more lexicon blocks 1604*a*, 1604*b*. The scenario can further include one or more natural language feature (NLF) blocks 1606*a*, 1606*b*. A non-limiting example of an NLF feature block 1606*a*, 1606*b* is a block that includes metadata that can be used by the scenario 1600. A non-limiting example of metadata is metadata that represents the directionality of an electronic communication.

Figure 17A:
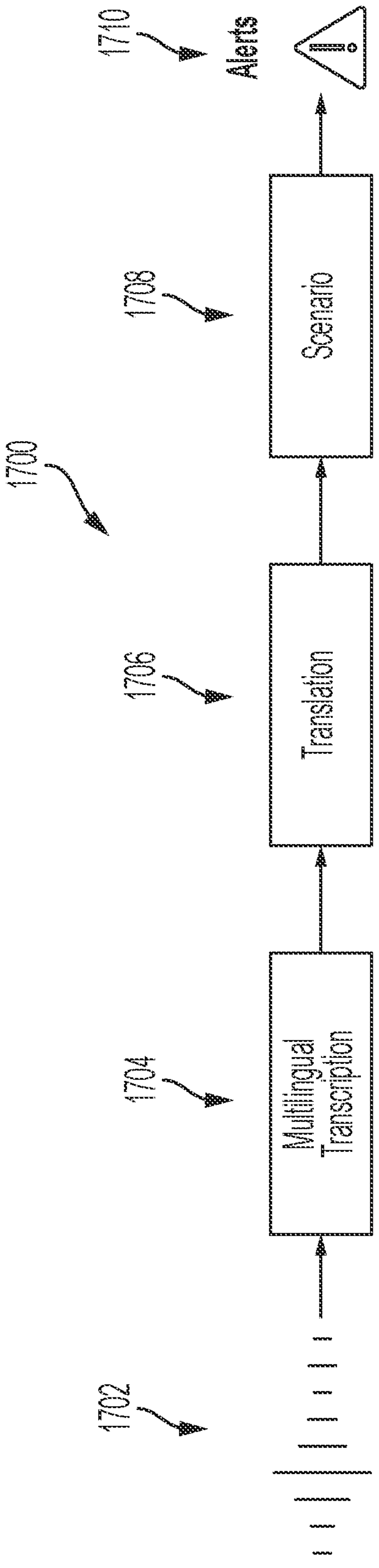
FIG. 17A illustrates a block diagram of a system for generating alerts using both multilingual transcription and translation.
Figure 17B:
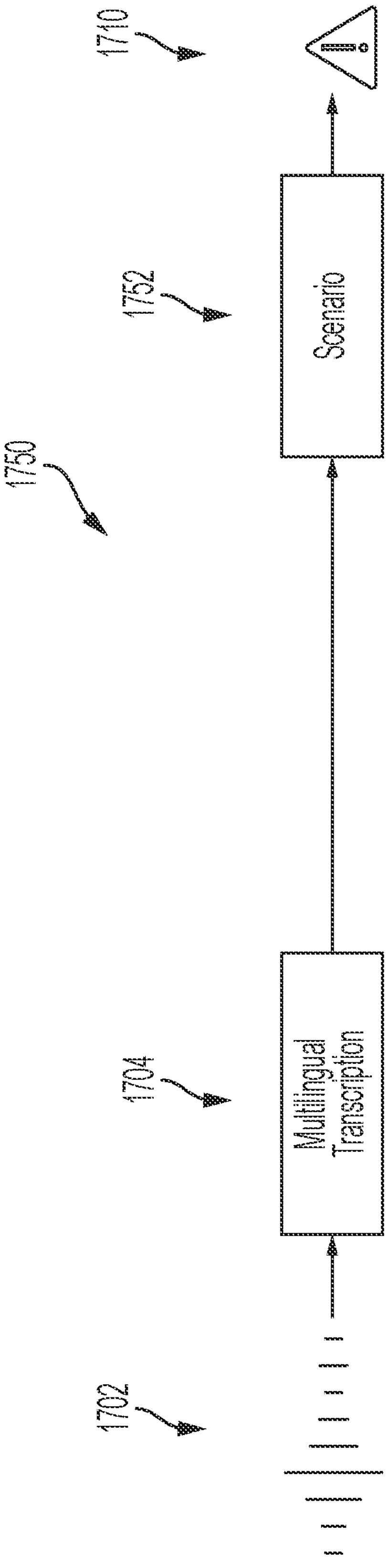
FIG. 17B illustrates a block diagram of a system for generating alerts using multilingual transcription without translation.

With reference to FIGS. 17A and 17B, block diagrams of systems for performing multilingual transcription and translation for use in scenarios (e.g., the scenario 1600 shown in FIG. 16) are shown.

FIG. 17A illustrates a system 1700 where transcribed text is translated before applying the scenario to the text. The system 1700 can include an audio input 1702, a multilingual transcription module 1704, a translation module 1706, a scenario module 1708, and an alert module 1710. The multilingual transcription module 1704 can convert all the speech in the audio input 1702 into text. Then, the translation module 1706 can convert the text into the same language (e.g., English). The scenario module 1708 can be a scenario module 1708 that is configured to work in English, and may or may not be capable of generating alerts with text from other languages. The scenario module 1708 can generate alerts 1710 by applying scenarios configured to work in English to the translated text that is output by the translation module 1706.

FIG. 17B illustrates a system 1750 where the transcribed text is not translated before applying the scenario to the text. The system 1750 receives an audio input 1702 into the multilingual transcription module 1704. The translated text is then input to the scenario 1752 without being translated. In the embodiment shown in FIG. 17B, the scenario can be a scenario that is configured to work on multiple languages. So, the scenario module 1752 can generate alerts 1710 on the input text transcribed from any number of different languages. Embodiments of the present disclosure that are configured to generate alerts based on text in different languages can be more accurate. Specifically, the step of translating the text to a single language can, in some embodiments, affect the meaning of the text and therefore reduce the accuracy of the alerts based on that text.

Still with reference to FIG. 17B, the scenario 1752 can be a scenario that includes machine learning blocks (e.g., the machine learning blocks 1602*a*, 1602*b*) that are configured to operate in multiple languages. Alternatively or additionally, the scenario 1752 can include lexicon blocks 1604*a*, 1604*b* and/or NLF blocks 1606*a*, 1606*b* that are configured to operate on multilingual text.

Embodiments of the present disclosure also include user interfaces that can be configured to display information about alerts derived from combinations of text and/or audio data.

Figure 6:
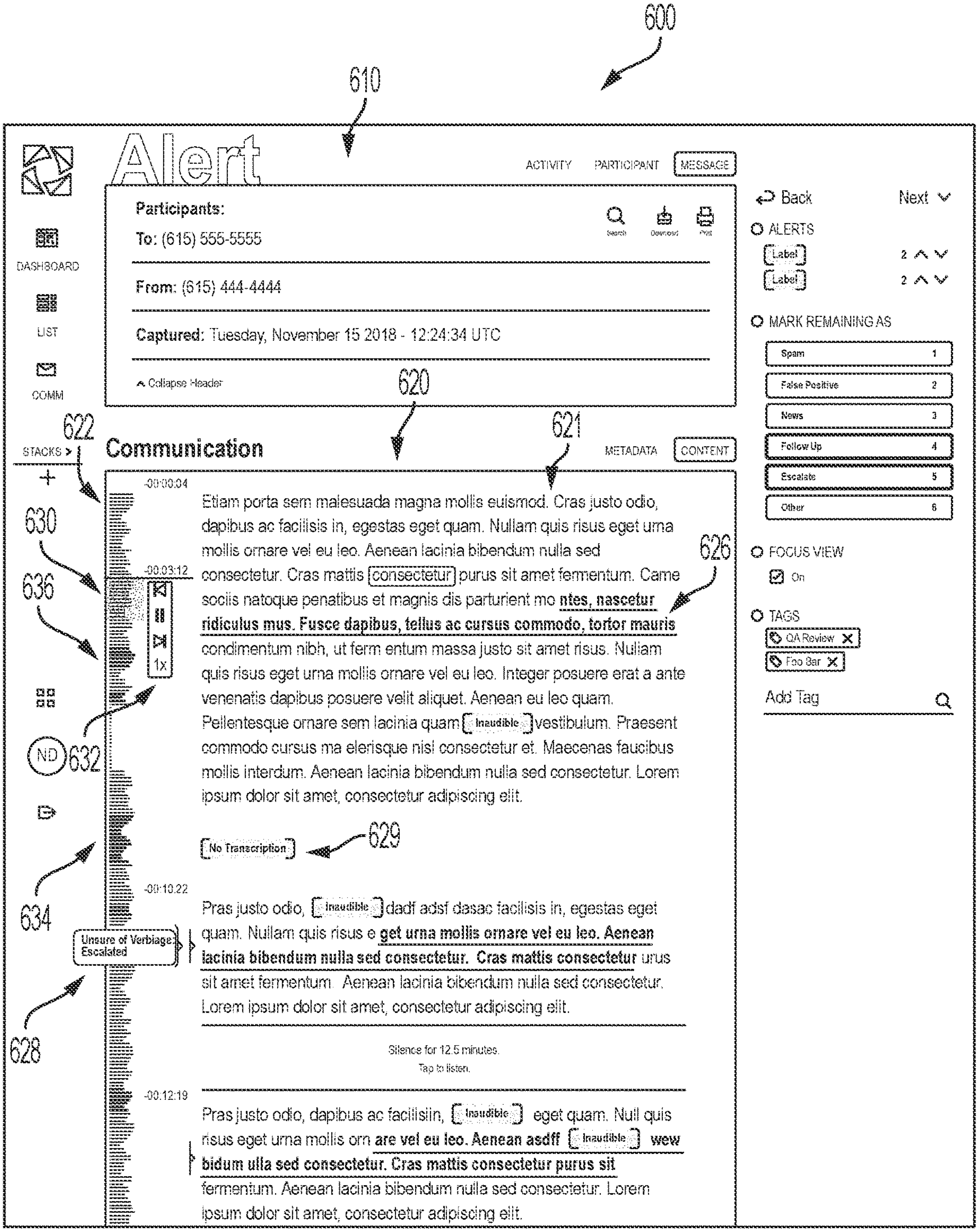
FIG. 6 illustrates aspects of an audio detail view, in accordance with one or more embodiments of the present disclosure.

FIG. 6 illustrates a user interface 600 for reviewing alerts on an audio communication that has been transcribed to text form. The user interface 600 can include a header 610 showing information about the communication that is being reviewed. The user interface can further include a window 620 displaying the transcribed text 621. A waveform 622 representing the audio communication can also be shown with the transcribed text 621. Optionally, as shown in FIG. 6, the waveform 622 is arranged in the same direction as the text 621, so that the waveform 622 is synchronized with the transcribed text 621. In other words, the audio recorded at a position on the waveform 622 is the same audio that is transcribed to the text adjacent to the waveform 622. The transcribed text 621 can also include highlighting, underlining 626, annotations 628, and other notes 629 that can be based on the transcription of the audio to text. For example, the underlining 626, annotations 628, and notes 629 can be added to the user interface 600 based on the output of the transcription and translation systems described with reference to FIGS. 15-17B. Additionally, embodiments of the present disclosure can adjust the opacity or color of the transcribed text 621 that is displayed in the user interface 600. Optionally, the interface can be configured to switch between a mode where the transcribed text 621 with underlining 626 is black, but the other text is grey, as shown in FIG. 6. This can be referred to as a "focus mode" where Still with reference to FIG. 6, the user can control the playback of the audio using a play head 630. When the audio is playing for the user, the play head 630 can move along the waveform 622, traveling down the page. Because the waveform 622 position can be synchronized with the text position, the movement of the play head can also indicate to the user what transcribed text 621 matches the audio that is being played. The user can control the position of the audio playback by moving the play head 630, or by using the controls 632 associated with the play head 630. Additionally, the user can control the playback of the audio using the waveform 622. For example, the user can click on the shaded portions 634, 636 of the waveform 622 to begin playing the audio that is represented by the shaded portions 634, 636 of the waveform 622.

Still with reference to FIG. 6, the play head 630 that is part of the user interface 600 can include different combinations of features to allow a user to control the playback/viewing of audio and/or text. In some embodiments of the present disclosure, both the waveform 622 and play head 630 are aligned to the transcribed text 621 (i.e. the transcription) (as described with reference to FIG. 6). In some embodiments of the present disclosure, the transcribed text 621 can be annotated in real time using a bouncing ball or other pointer (not shown) to point to each word as it is spoken (a "sing a long" mode).

Additionally, embodiments of the present disclosure can be configured to operate in a web browser. The play head 630 and waveform 622 can be configured so that, during audio playback, the browser page scrolls with the play head 630. As the browser page scrolls, the transcribed text 621 can scroll with the play head so that the transcribed text 621 and play head 630 are visible as the text progresses.

Again with reference to FIG. 6, the waveform can be shaded or color coded. Optionally, when the transcribed text 621 is underlined, the color of the underlining can match the color of the waveform at a specific location. In other words, a sentence that is underlined in blue can be highlighted on the waveform 622 in blue, so that clicking the waveform 622 at the blue shaded location plays back the audio corresponding to the text underlined in blue. FIG. 6 illustrates a waveform that is shaded in one color at a first point 634, and another color at another point 636. It should be understood that any portion of the waveform can be shaded, and that any number of shading colors can be used in different embodiments of the present disclosure.

Figure 7:
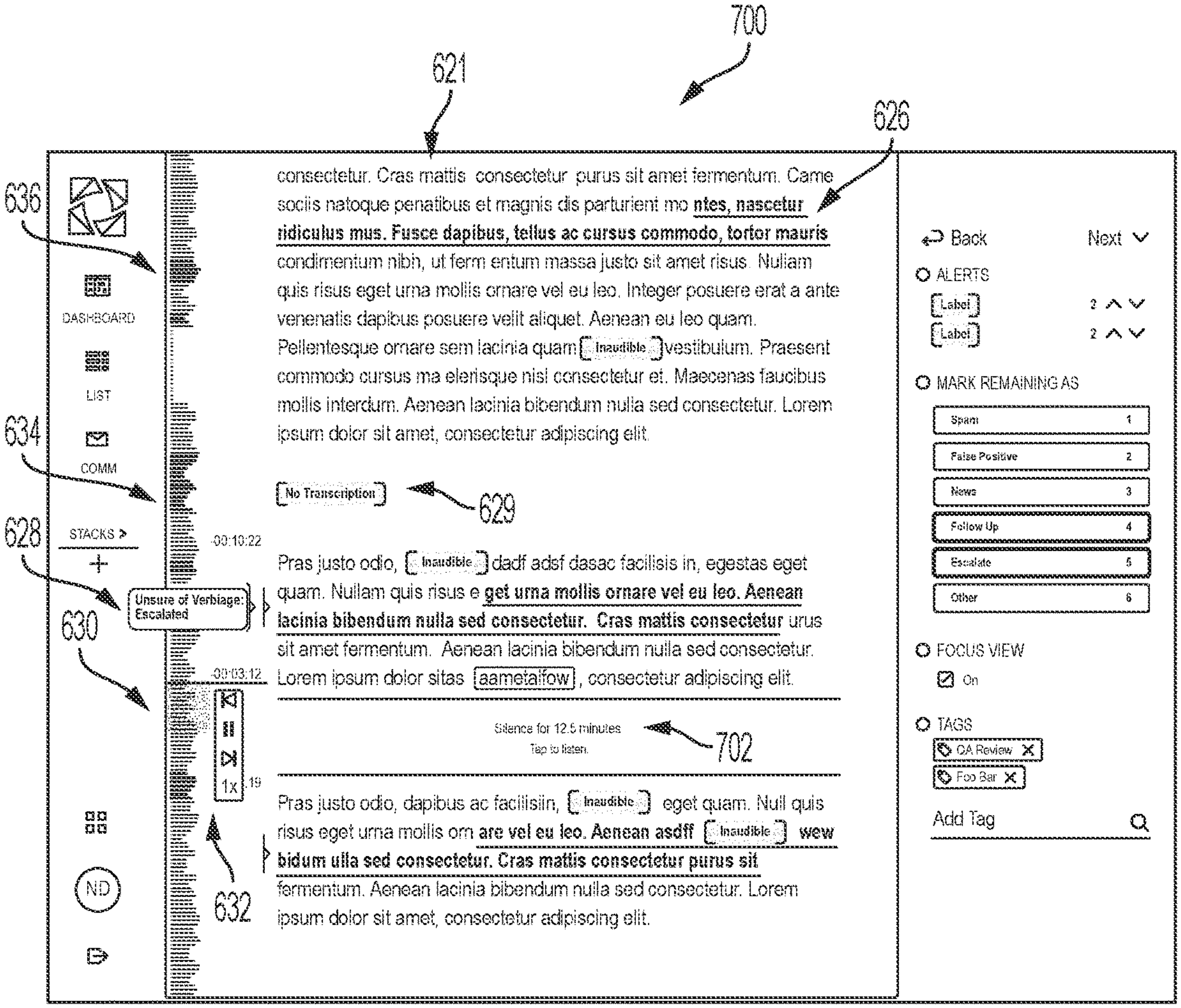
FIG. 7 illustrates aspects of scrolling, in accordance with one or more embodiments of the present disclosure.

With reference to FIG. 7, a user interface 700 is shown that illustrates the movement of the play head 630. The transcribed text 621 in FIG. 7 is the same as FIG. 6, but the play head 630 has moved down the transcribed text 621 as the audio is played back. FIG. 7 also shows that the user interface 700 can include controls 702 for skipping sections of silence that are detected in the audio. Again, the user interface can determine whether there is silence in the audio playback based on the output of the transcription and translation systems described with reference to FIGS. 15-17B. For example, the voice activity detection module 1516 illustrated in FIG. 15 can detect the silence in the audio.

Additional example user interfaces are shown in FIGS. 1-5 and 8-14, that can be used to display the information described with reference to FIGS. 6, 7, and 15-17B.

FIG. 1 illustrates aspects of displayed events, properties, and communications data, in accordance with one or more embodiments of the present disclosure.

FIGS. 2A and 2B illustrate various aspects of policies, including scenario, population, and workflow, in accordance with one or more embodiments of the present disclosure. FIG. 2A illustrates a block diagram of a policy 200. FIG. 2B illustrates a block diagram of an implementation of the policy 200 shown in FIG. 2A, according to some embodiments of the present disclosure. The scenario 208 can include at least one signal 202 and at least one metric 204. Optionally, the scenario 208 can also include any/all of the blocks illustrated and described in FIG. 16. The policy also can include a population 210. The population 210 can represent the group of communications or users that the scenario 208 will be applied to. The policy 200 can also include a workflow 212 that represents the actions taken when a scenario match occurs. A scenario match can occur when a communication or communications in the population 210 matches the signal 202 and metric 204 of the scenario 208. Alternatively, the scenario match can occur when the communication or communications in the population 210 matches the combination of blocks illustrated in FIG. 16. The workflow 212 block can include generating an alert and displaying that alert to the user.

FIG. 3 illustrates various aspects displayed to a user, including elements of a graphical user interface, including sidebar, content, and aside areas, in accordance with one or more embodiments of the present disclosure.

Figure 4:
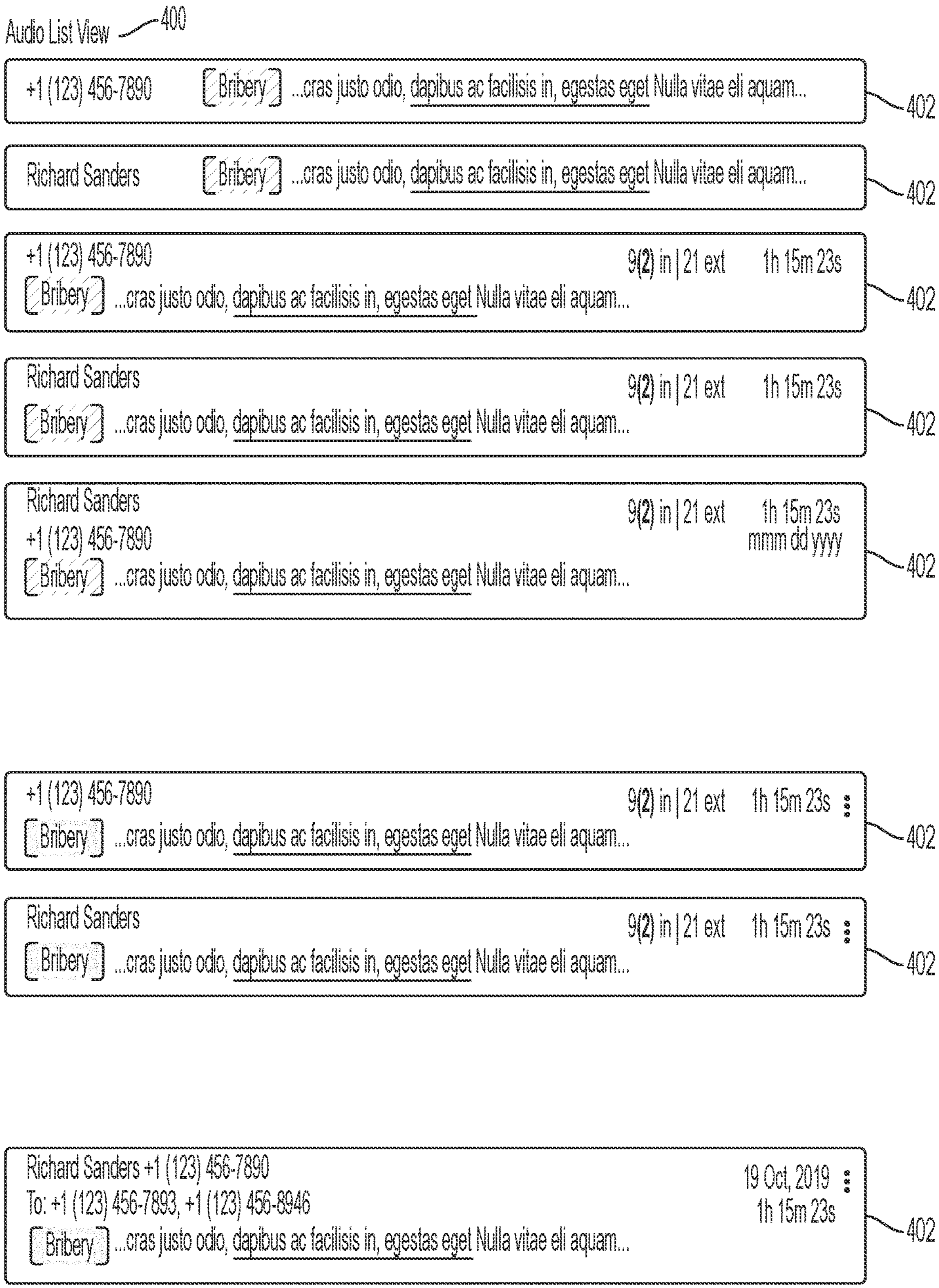
FIG. 4 illustrates aspects of an audio list view, in accordance with one or more embodiments of the present disclosure.

FIG. 4 illustrates aspects of an audio list view 400, in accordance with one or more embodiments of the present disclosure. As described with reference to FIG. 15, embodiments of the present disclosure can include audio inputs 1512 that can be audio files. The audio list view 400 can display a list of the audio files in individual tiles 402 that display information about the information in those audio files.

Figure 5:
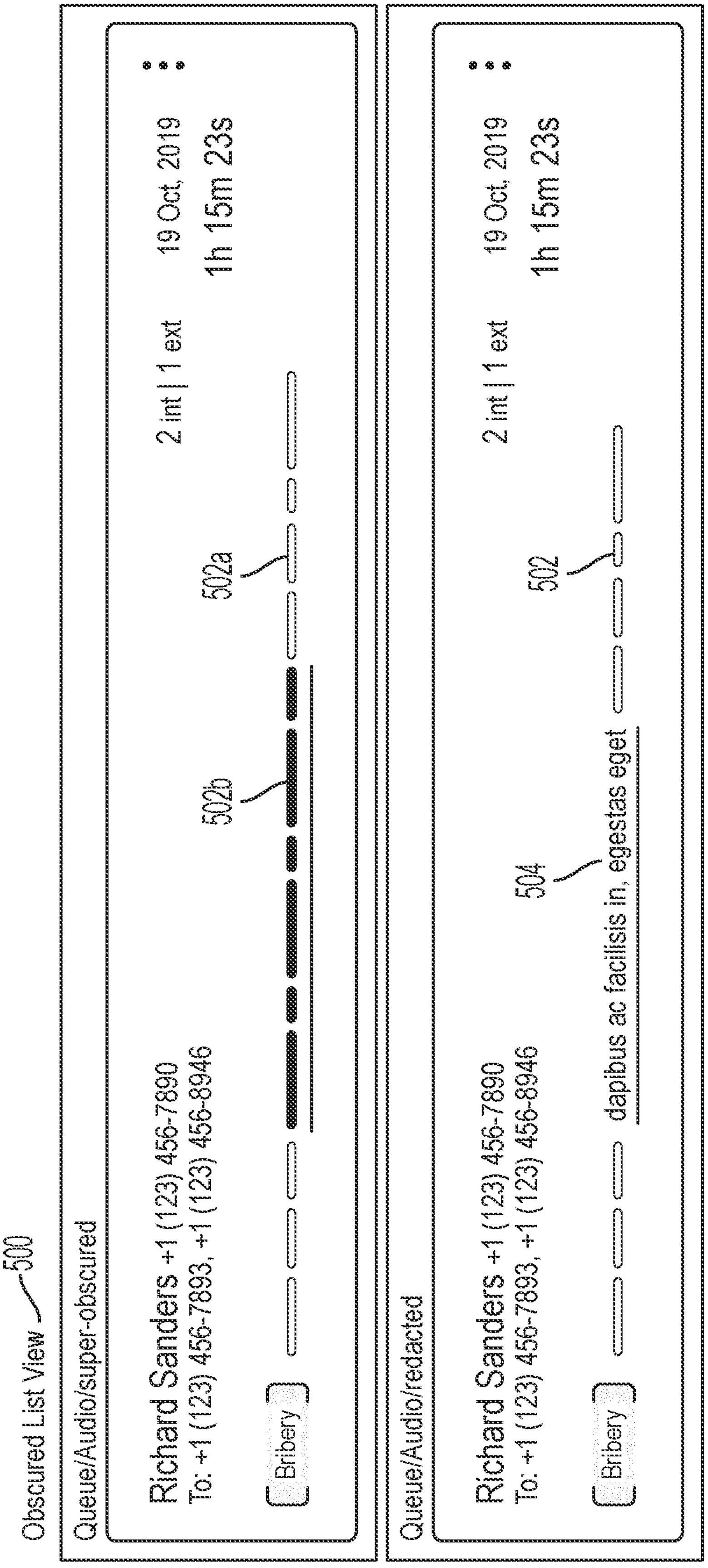
FIG. 5 illustrates aspects of an obscured list view, in accordance with one or more embodiments of the present disclosure.

FIG. 5 illustrates aspects of an obscured list view 500, in accordance with one or more embodiments of the present disclosure. The obscured list view 500 can replace some or all of the text with placeholder boxes or lines 502*a* that do not display the complete text. In some embodiments of the present disclosure, the placeholder lines can be shaded 502*b*. Optionally, as shown in FIG. 5, select portions of the text 504 can be displayed to the user surrounded by the placeholder lines 502*a*.

Figure 9:
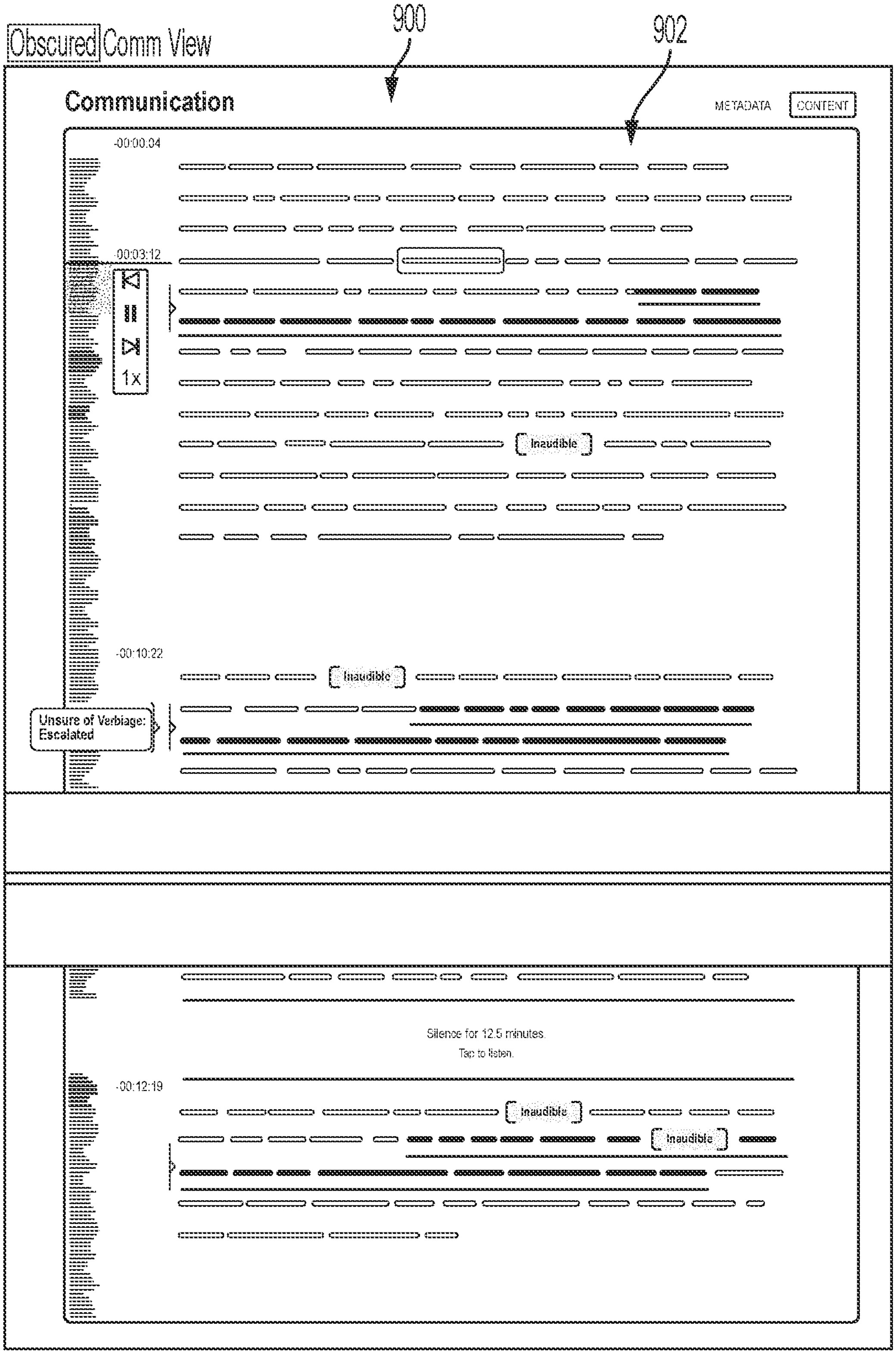
FIG. 9 illustrates aspects of obscured communication view, in accordance with one or more embodiments of the present disclosure.

The present disclosure contemplates that any portion of the text can be replaced with placeholder boxes or lines. FIG. 9 illustrates aspects of obscured communication view 900, in accordance with one or more embodiments of the present disclosure. The transcribed text 621 described with reference to FIG. 6 has been replaced with placeholder lines 902 representing the transcribed text.

Figure 8:
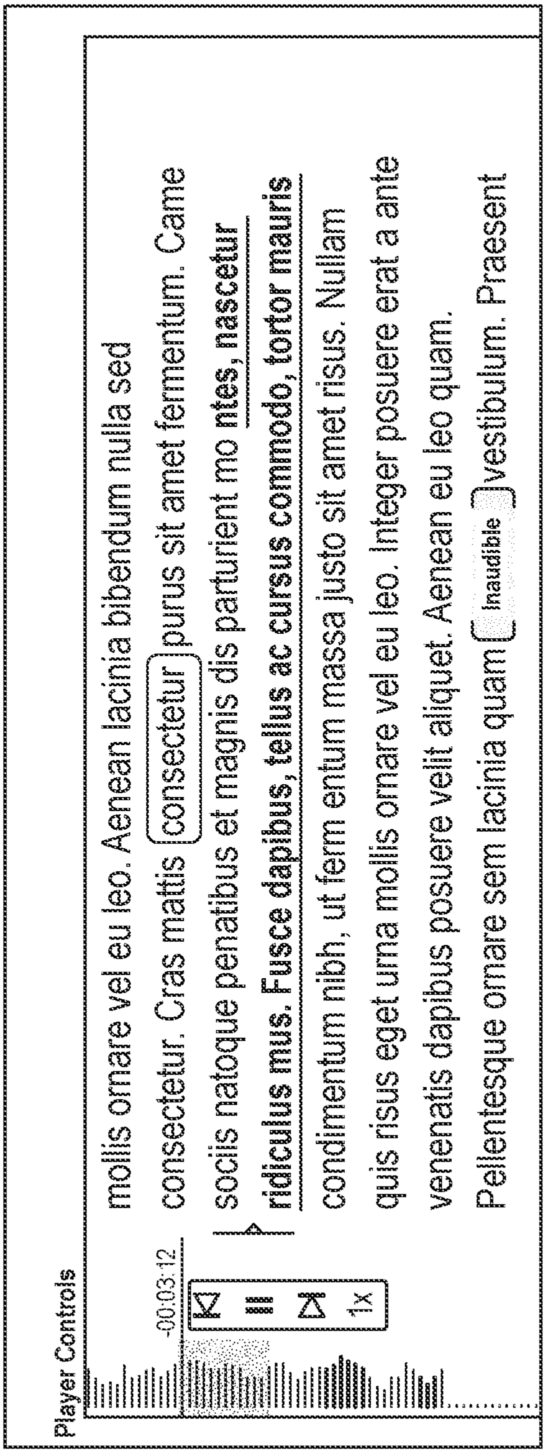
FIG. 8 illustrates aspects of player controls, in accordance with one or more embodiments of the present disclosure.

FIG. 8 illustrates aspects of player controls described with reference to FIGS. 6 and 7, in accordance with one or more embodiments of the present disclosure.

Figure 10:
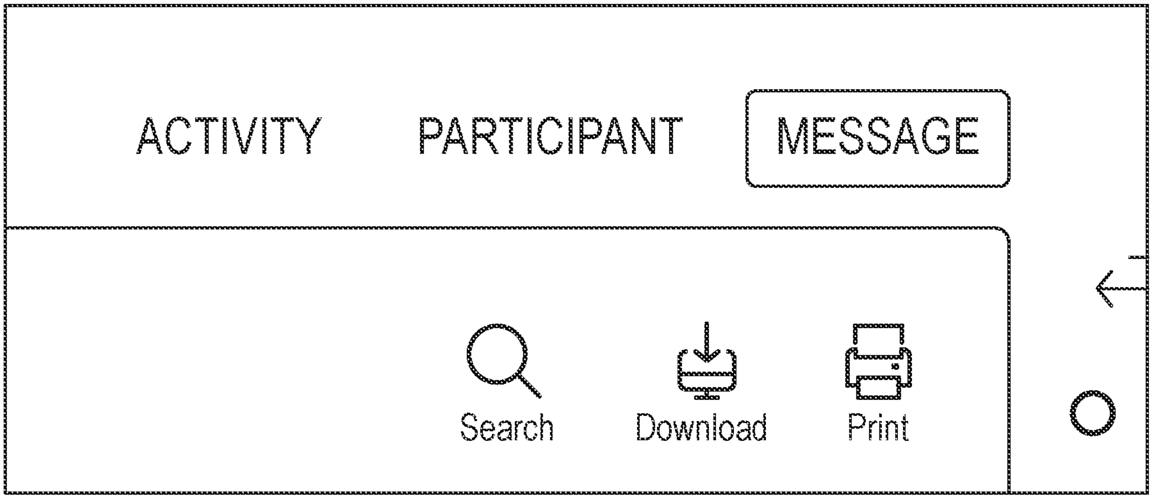
FIG. 10 illustrates aspects top navigation-activity, in accordance with one or more embodiments of the present disclosure.

FIG. 10 illustrates aspects top navigation-activity, in accordance with one or more embodiments of the present disclosure.

Figure 11:
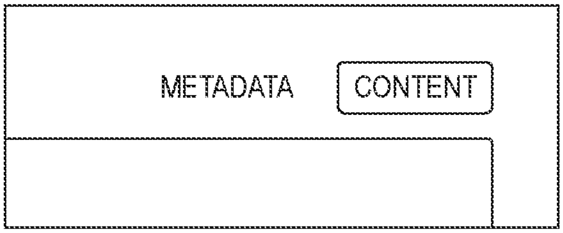
FIG. 11 illustrates aspects of top navigation-metadata, in accordance with one or more embodiments of the present disclosure.

FIG. 11 illustrates aspects of top navigation-metadata, in accordance with one or more embodiments of the present disclosure.

Figure 12:
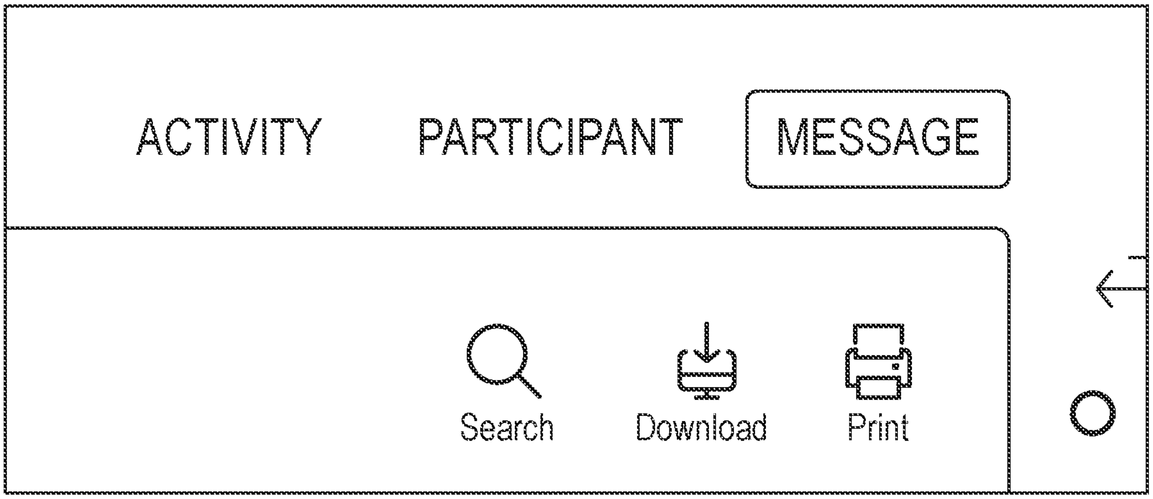
FIG. 12 illustrates aspects of top navigation-activity, in accordance with one or more embodiments of the present disclosure.

FIG. 12 illustrates aspects of top navigation-activity, in accordance with one or more embodiments of the present disclosure.

Figure 13:
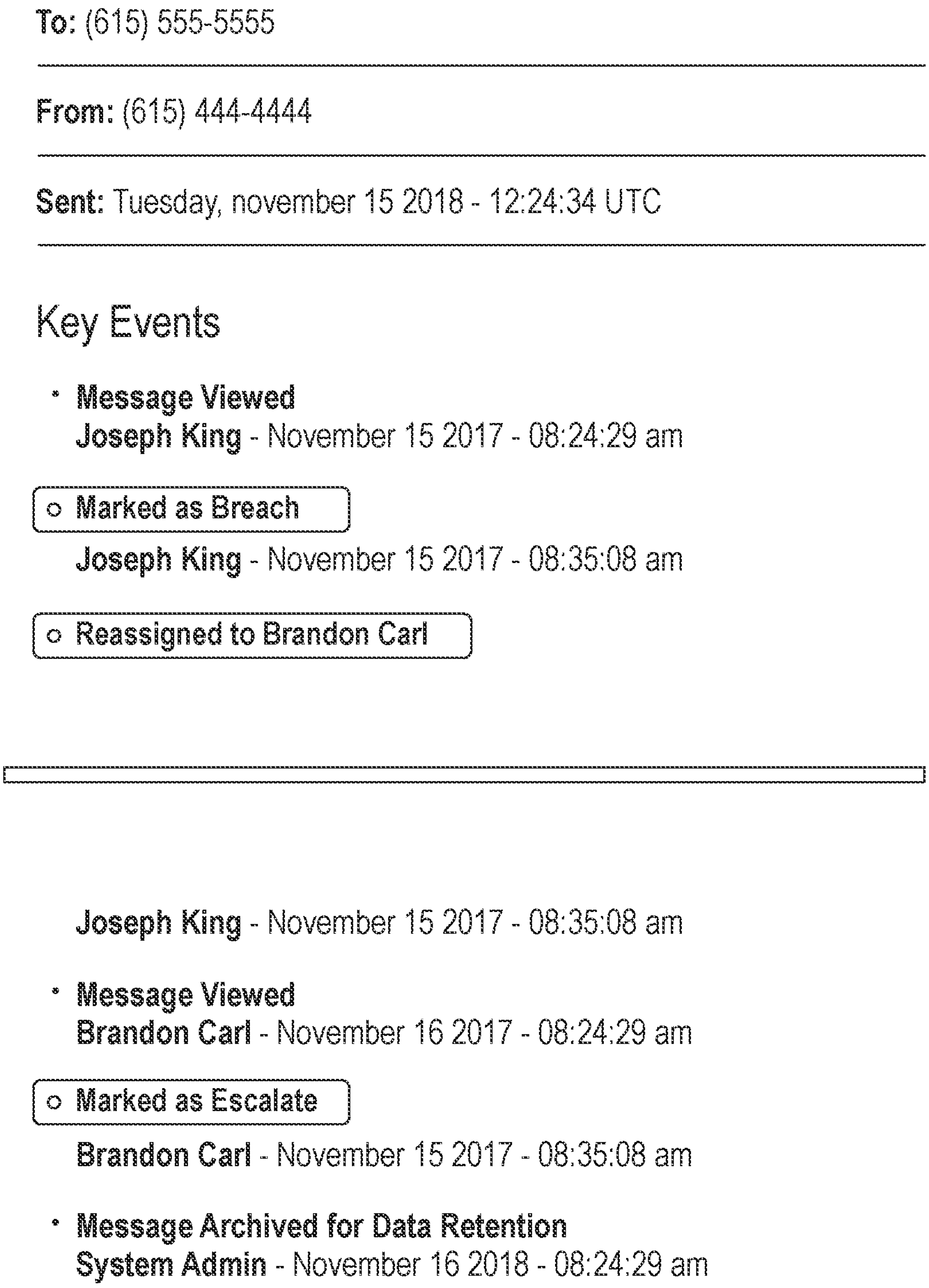
FIG. 13 illustrates aspects of top navigation, in accordance with one or more embodiments of the present disclosure.

FIG. 13 illustrates aspects of top navigation, in accordance with one or more embodiments of the present disclosure.

Figure 14:
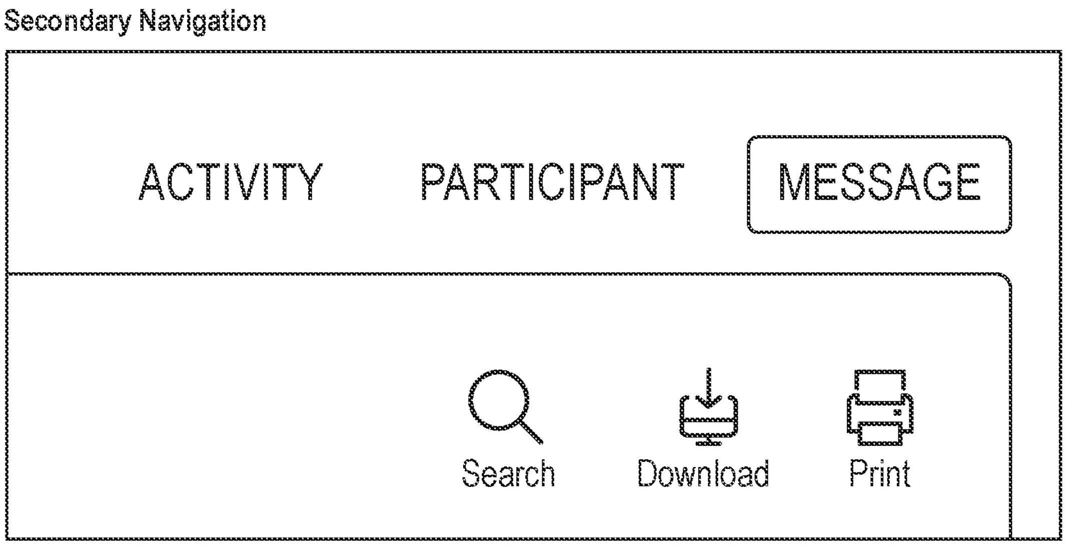
FIG. 14 illustrates aspects of secondary navigation, in accordance with one or more embodiments of the present disclosure.

FIG. 14 illustrates aspects of secondary navigation, in accordance with one or more embodiments of the present disclosure.

Example Computing System Architecture

FIG. 18 is a computer architecture diagram showing a general computing system capable of implementing one or more embodiments of the present disclosure described herein. A computer 1800 may be configured to perform one or more functions associated with embodiments illustrated in one or more of FIGS. 1-17B. It should be appreciated that the computer 1800 may be implemented within a single computing device or a computing system formed with multiple connected computing devices. For example, the computer 1800 may be configured for a server computer, desktop computer, laptop computer, or mobile computing device such as a smartphone or tablet computer, or the computer 1800 may be configured to perform various distributed computing tasks, which may distribute processing and/or storage resources among the multiple devices.

As shown, the computer 1800 includes a processing unit 1802, a system memory 1804, and a system bus 1806 that couples the memory 1804 to the processing unit 1802. The computer 1800 further includes a mass storage device 1812 for storing program modules. The program modules 1814 may include modules executable to perform one or more functions associated with embodiments illustrated in one or more of FIGS. 1-17B. The mass storage device 1812 further includes a data store 1816.

The mass storage device 1812 is connected to the processing unit 1802 through a mass storage controller (not shown) connected to the bus 1806. The mass storage device 1812 and its associated computer storage media provide non-volatile storage for the computer 1800. By way of example, and not limitation, computer-readable storage media (also referred to herein as "computer-readable storage medium" or "computer-storage media" or "computer-storage medium") may include volatile and non-volatile, removable and non-removable media implemented in any method or technology for storage of information such as computer-storage instructions, data structures, program modules, or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 1800. Computer-readable storage media as described herein does not include transitory signals.

According to various embodiments, the computer 1800 may operate in a networked environment using connections to other local or remote computers through a network 1818 via a network interface unit 1810 connected to the bus 1806. The network interface unit 1810 may facilitate connection of the computing device inputs and outputs to one or more suitable networks and/or connections such as a local area network (LAN), a wide area network (WAN), the Internet, a cellular network, a radio frequency network, a Bluetooth-enabled network, a Wi-Fi enabled network, a satellite-based network, or other wired and/or wireless networks for communication with external devices and/or systems.

The computer 1800 may also include an input/output controller 1808 for receiving and processing input from a number of input devices. Input devices may include, but are not limited to, keyboards, mice, stylus, touchscreens, microphones, audio capturing devices, or image/video capturing devices. An end user may utilize such input devices to interact with a user interface, for example a graphical user interface on one or more display devices (e.g., computer screens), for managing various functions performed by the computer 1800, and the input/output controller 808 may be configured to manage output to one or more display devices for visually representing data.

The bus 1806 may enable the processing unit 1802 to read code and/or data to/from the mass storage device 1812 or other computer-storage media. The computer-storage media may represent apparatus in the form of storage elements that are implemented using any suitable technology, including but not limited to semiconductors, magnetic materials, optics, or the like. The program modules 1814 may include software instructions that, when loaded into the processing unit 1802 and executed, cause the computer 1800 to provide functions associated with embodiments illustrated in FIGS. 1-17B. The program modules 1814 may also provide various tools or techniques by which the computer 1800 may participate within the overall systems or operating environments using the components, flows, and data structures discussed throughout this description. In general, the program module 1814 may, when loaded into the processing unit 1802 and executed, transform the processing unit 1802 and the overall computer 1800 from a general-purpose computing system into a special-purpose computing system.

The processing unit 1802 may be constructed from any number of transistors or other discrete circuit elements, which may individually or collectively assume any number of states. More specifically, the processing unit 1802 may operate as a finite-state machine, in response to executable instructions contained within the program modules 1814. These computer-executable instructions may transform the processing unit 1802 by specifying how the processing unit 1802 transitions between states, thereby transforming the transistors or other discrete hardware elements constituting the processing unit 1802. Encoding the program modules 1814 may also transform the physical structure of the computer-readable storage media. The specific transformation of physical structure may depend on various factors, in different implementations of this description. Examples of such factors may include, but are not limited to: the technology used to implement the computer-readable storage media, whether the computer-readable storage media are characterized as primary or secondary storage, and the like. For example, if the computer-readable storage media are implemented as semiconductor-based memory, the program modules 1814 may transform the physical state of the semiconductor memory, when the software is encoded therein. For example, the program modules 1814 may transform the state of transistors, capacitors, or other discrete circuit elements constituting the semiconductor memory.

As another example, the computer-storage media may be implemented using magnetic or optical technology. In such implementations, the program modules 1814 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present disclosure.

CONCLUSION

The various example embodiments described above are provided by way of illustration only and should not be construed to limit the scope of the present disclosure. Certain patentable aspects of the present disclosure are presented in the appended claims. Those skilled in the art will readily recognize various modifications and changes that may be made to the present disclosure without following the example embodiments and applications illustrated and described herein, and without departing from the true spirit and scope of the present disclosure.

What is claimed is:

1. A computer-implemented method, comprising:

receiving audio data;

transcribing the audio data into text, based on one or more languages being spoken within the audio data;

identifying a potential violation of a predetermined standard within at least the transcribed text, wherein the identified potential violation corresponds to a match of a potential violation of a predetermined policy, wherein the policy corresponds to at least one scenario and target population, and wherein the predetermined standard is based on the at least one scenario;

generating an alert in response to the match of the potential violation of the predetermined policy;

generating an audio waveform representing the audio data and outputting a visual representation corresponding to the audio waveform, wherein the visual representation of the audio waveform is displayed along a vertical axis and the visual representation corresponding to the audio waveform comprises a first portion in a first formatting and a second portion in a second formatting; and generating a visual representation of the transcribed text, along a horizontal axis perpendicular to the vertical axis, such that lines of the transcribed text, as output for display, are synchronized with and align with corresponding portions of the audio waveform, a first portion of text corresponding to the first portion of the audio waveform is in the first formatting, and a second portion of text corresponding to the second portion of the audio waveform is in the second formatting.

2. The method of claim 1, further comprising receiving text data from an electronic communication between persons, and wherein identifying the potential violation of the predetermined standard further comprises identifying the potential violation based on both the audio data and the received text data from the electronic communication.

3. The method of claim 1, wherein transcribing the audio data into text is based on multiple languages being spoken within the audio data.

4. The method of claim 1, wherein identifying the potential violation comprises implementing a machine learning model.

5. The method of claim 1, wherein the at least one scenario comprises a lexicon representing one or more terms or regular expressions.

6. The method of claim 1, wherein the at least one scenario comprises at least one of features corresponding to a machine learning model, features corresponding to a lexicon, and natural language features.

7. The method of claim 6, wherein the at least one scenario is formed by joining the machine learning features and the lexicon features, using Boolean operators.

8. The method of claim 1, further comprising outputting, for display, a play head configured to move through the audio waveform and/or corresponding, aligned text during playback.

9. The method of claim 8, wherein the play head moves vertically along the audio waveform as the transcribed text moves forwards or backwards in playback.

10. The method of claim 8, wherein the movement of the play head is controllable by a user based on received user input.

11. The method of claim 1, wherein as the audio data corresponding to the audio waveform moves forwards or backwards in playback, the location in time within the audio waveform is visually emphasized within the visual representation of the audio waveform.

12. The method of claim 1, wherein as the transcribed text corresponding to the audio data moves forwards or backwards in playback, the location in time corresponding to a corresponding segment of the transcribed text is visually emphasized.

13. The method of claim 11, wherein the emphasized segment of the transcribed text is underlined and/or highlighted.

14. The method of claim 1, wherein as the audio waveform and transcribed text are scrolled during playback, as displayed, the audio waveform and transcribed text scrolls in synchronization with the playback.

15. The method of claim 1, wherein the audio waveform and transcribed text are displayed within a webpage and the audio waveform and transcribed text scroll content of the webpage in synchronization with the playback.

16. The method of claim 1, wherein the visual representation corresponding to the audio waveform and the visual representation of the transcribed text are output for display to a user in an interactive graphical user interface.

17. A system, comprising: a voice surveillance system configured to:
- receive audio data, and
- transcribe the audio data into text, based on one or more languages being spoken within the audio data; and
- an electronic communications surveillance system, configured to:
- identify a potential violation of a predetermined standard within at least the transcribed text, wherein the identified potential violation corresponds to a match of a potential violation of a predetermined policy, wherein the policy corresponds to at least one scenario and target population, and wherein the predetermined standard is based on the at least one scenario,
- generate an alert in response to the match of the potential violation of the predetermined policy, and
- wherein the voice surveillance system and/or the electronic communications system are configured to:
  - generate an audio waveform representing the audio data and output a visual representation corresponding to the audio waveform, wherein the visual representation of the audio waveform is displayed along a vertical axis and the visual representation corresponding to the audio waveform comprises a first portion in a first formatting and a second portion in a second formatting, and
  - generate a visual representation of the transcribed text, along a horizontal axis perpendicular to the vertical axis, such that lines of the transcribed text, as output for display, are synchronized with and align with corresponding portions of the audio waveform, a first portion of text corresponding to the first portion of the audio waveform is in the first formatting, and a second portion of text corresponding to the second portion of the audio waveform is in the second formatting.

18. The system of claim 17, wherein the electronic communications surveillance system is configured to:
- receive text data from an electronic communication between persons, and wherein identifying the potential violation of the predetermined standard further comprises identifying the potential violation based on both the audio data and the received text data from the electronic communication.

19. The system of claim 17, wherein the voice surveillance system and/or the electronic communications system are configured to:
- output, for display, a play head configured to move through the audio waveform and/or corresponding, aligned text during playback.

20. The system of claim 19, wherein the play head moves vertically along the audio waveform as the transcribed text moves forwards or backwards in playback.

21. The system of claim 19, wherein the movement of the play head is controllable by a user based on received user input through a graphical user interface.

22. The system of claim 17, wherein as the audio data corresponding to the audio waveform moves forwards or backwards in playback, the location in time within the audio waveform is visually emphasized within the visual representation of the audio waveform.

23. The system of claim 17, wherein as the transcribed text corresponding to the audio data moves forwards or backwards in playback, the location in time corresponding to a corresponding segment of the transcribed text is visually emphasized.

24. The system of claim 23, wherein the emphasized segment of the transcribed text is underlined and/or highlighted.

25. The system of claim 17, wherein as the audio waveform and transcribed text are scrolled during playback, as displayed, the audio waveform and transcribed text scrolls in synchronization with the playback.

26. The system of claim 17, wherein the audio waveform and transcribed text are displayed within a webpage and the audio waveform and transcribed text scroll content of the webpage in synchronization with the playback.

27. The system of claim 17, wherein the visual representation corresponding to the audio waveform and the visual representation of the transcribed text are output for display to a user in an interactive graphical user interface.

28. A non-transitory computer-readable medium storing instructions which, when executed by one or more processors, cause a computing system to perform functions that comprise:
- receiving audio data;
- transcribing the audio data into text, based on one or more languages being spoken within the audio data;
- identifying a potential violation of a predetermined standard within at least the transcribed text, wherein the identified potential violation corresponds to a match of a potential violation of a predetermined policy, wherein the policy corresponds to at least one scenario and target population, and wherein the predetermined standard is based on the at least one scenario;
- generating an alert in response to the match of the potential violation of the predetermined policy;
- generating an audio waveform representing the audio data and outputting a visual representation corresponding to the audio waveform, wherein the visual representation of the audio waveform is displayed along a vertical axis and the visual representation corresponding to the audio waveform comprises a first portion in a first formatting and a second portion in a second formatting; and
- generating a visual representation of the transcribed text, along a horizontal axis perpendicular to the vertical axis, such that lines of the transcribed text, as output for display, are synchronized with and align with corresponding portions of the audio waveform, a first portion of text corresponding to the first portion of the audio waveform is in the first formatting, and a second portion of text corresponding to the second portion of the audio waveform is in the second formatting.

* * * * *